United States Patent
Jeong et al.

(10) Patent No.: US 8,290,271 B2
(45) Date of Patent: Oct. 16, 2012

(54) METHOD, MEDIUM AND APPARATUS CORRECTING PROJECTED IMAGE

(75) Inventors: Moon-sik Jeong, Yongin-si (KR);
Yong-beom Lee, Yongin-si (KR);
Sei-bum Ban, Yongin-si (KR); Tae-suh Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1080 days.

(21) Appl. No.: 11/711,005

(22) Filed: Feb. 27, 2007

(65) Prior Publication Data
US 2007/0274588 A1 Nov. 29, 2007

(30) Foreign Application Priority Data

Apr. 3, 2006 (KR) .................. 10-2006-0030326
Nov. 3, 2006 (KR) .................. 10-2006-0108508

(51) Int. Cl.
*G06K 9/00* (2006.01)
(52) U.S. Cl. ....................................................... 382/181
(58) Field of Classification Search ................... 382/181
See application file for complete search history.

(56) References Cited

U.S. PATENT DOCUMENTS

| 2005/0207046 A1* | 9/2005 | Tamura ............... 359/891 |
| 2006/0038962 A1* | 2/2006 | Matsumoto et al. ........... 353/69 |
| 2006/0139762 A1* | 6/2006 | Sakai ................ 359/649 |
| 2006/0164525 A1* | 7/2006 | Hosyuyama ............... 348/239 |
| 2007/0195285 A1* | 8/2007 | Jaynes et al. ............. 353/69 |
| 2008/0291402 A1* | 11/2008 | Kobayashi ................ 353/69 |

FOREIGN PATENT DOCUMENTS

| EP | 1615449 A1 * | 1/2006 |
| JP | 9-37277 | 2/1997 |
| JP | 2000-50319 | 2/2000 |
| JP | 2005-148298 | 6/2005 |
| JP | 2005148298 A * | 6/2005 |
| KR | 2003-0033599 | 5/2003 |

* cited by examiner

*Primary Examiner* — Jingge Wu
*Assistant Examiner* — Nirav G Patel
(74) *Attorney, Agent, or Firm* — Staas & Halsey LLP

(57) ABSTRACT

A method, medium and apparatus for correcting a projected image is provided. The method includes detecting a pattern image based on photographing information of consecutive image frames into which a reference pattern and an offset pattern corresponding to the reference pattern are alternately inserted and which are projected onto a projection surface accordingly, and correcting projected image frame, based on the detected pattern image.

35 Claims, 21 Drawing Sheets

GEOMETRIC PATTERN WITH VERTICAL STRUCTURE

GEOMETRIC PATTERN WITH HORIZONTAL STRUCTURE

METHOD, MEDIUM AND APPARATUS CORRECTING PROJECTED IMAGE

CROSS-REFERENCE TO RELATED APPLICATIONS

This application claims priority from Korean Patent Applications No. 10-2006-0030326 and No. 10-2006-0108508 respectively filed on Apr. 3, 2006 and Nov. 3, 2006 in the Korean Intellectual Property Office, the disclosure of which is incorporated herein by reference in its entirety.

BACKGROUND

1. Field

One or more embodiments of the present invention relate to image correction, and more particularly, to a method, medium and apparatus correcting a projected image.

2. Description of the Related Art

A display system using a projector displays an image frame by projecting the image frame onto a flat screen. If the screen has a color of its own, the color of the image frame projected onto the screen is distorted compared with that of the actual image frame. In addition, if the screen is not perfectly flat, the projected image frame may have a geometric distortion due to the curvature or irregular surface of the screen.

In order to correct such distortion of the projected image frame, chromatic and geometric characteristics of the screen must be modeled. According to a conventional method of modeling characteristics of a screen, a predetermined pattern is projected onto the screen before an image frame is projected. Then, the projected pattern is photographed using a camera, and the projected pattern is compared with a photographed pattern. Based on the comparison result, a function indicating characteristics of the screen is obtained. Then, a reversed function of the function obtained is applied to the image frame that is to be projected onto the screen, thereby correcting the distortion of the image frame. Consequently, a user can view a corrected image frame.

There is a growing need for a technology to correct the distortion of an image frame caused by characteristics of a projection surface in order to project the image frame onto a projector screen or a projection surface such as a wall or a curtain.

However, since a pattern image for correction must be projected before an image frame is projected according to the conventional method, the correction process is cumbersome. Furthermore, the projection of the image frame must be delayed until the correction process is completed. Such inconvenience is aggravated in an environment where characteristics of a projection surface may vary according to the movement of the projection surface, or lighting changes.

Therefore, a technology for projecting an image frame while correcting the distortion of the image frame caused by characteristics of a projection surface, without user awareness, is needed.

SUMMARY

Aspects of the present invention are to correct the distortion of an image frame, which is caused by characteristics of a projection surface, without user awareness.

Additional aspects and/or advantages of the invention will be set forth in part in the description which follows and, in part, will be apparent from the description, or may be learned by practice of the invention.

According to an aspect of the present invention, there is provided an image correction method including detecting a pattern image based on consecutive image frames into which a reference pattern and an offset pattern are alternately inserted, and correcting a projected image frame based on the detecting.

According to another aspect of the present invention, there is provided an image correction apparatus including a pattern detection module to detect a pattern image based on consecutive image frames into which a reference pattern and an offset pattern are alternately inserted, and an image processing module to correct a projected image frame based on the detected pattern image.

According to another aspect of the present invention, there is provided a projected image correction method including generating a first image frame into which a reference pattern is inserted, and alternately generating a second image frame, consecutive to the first image frame, into which an offset pattern is inserted.

BRIEF DESCRIPTION OF THE DRAWINGS

These and/or other aspects and advantages of the invention will become apparent and more readily appreciated from the following description of embodiments, taken in conjunction with the accompanying drawings of which.

DETAILED DESCRIPTION OF EMBODIMENTS

Figure 1:
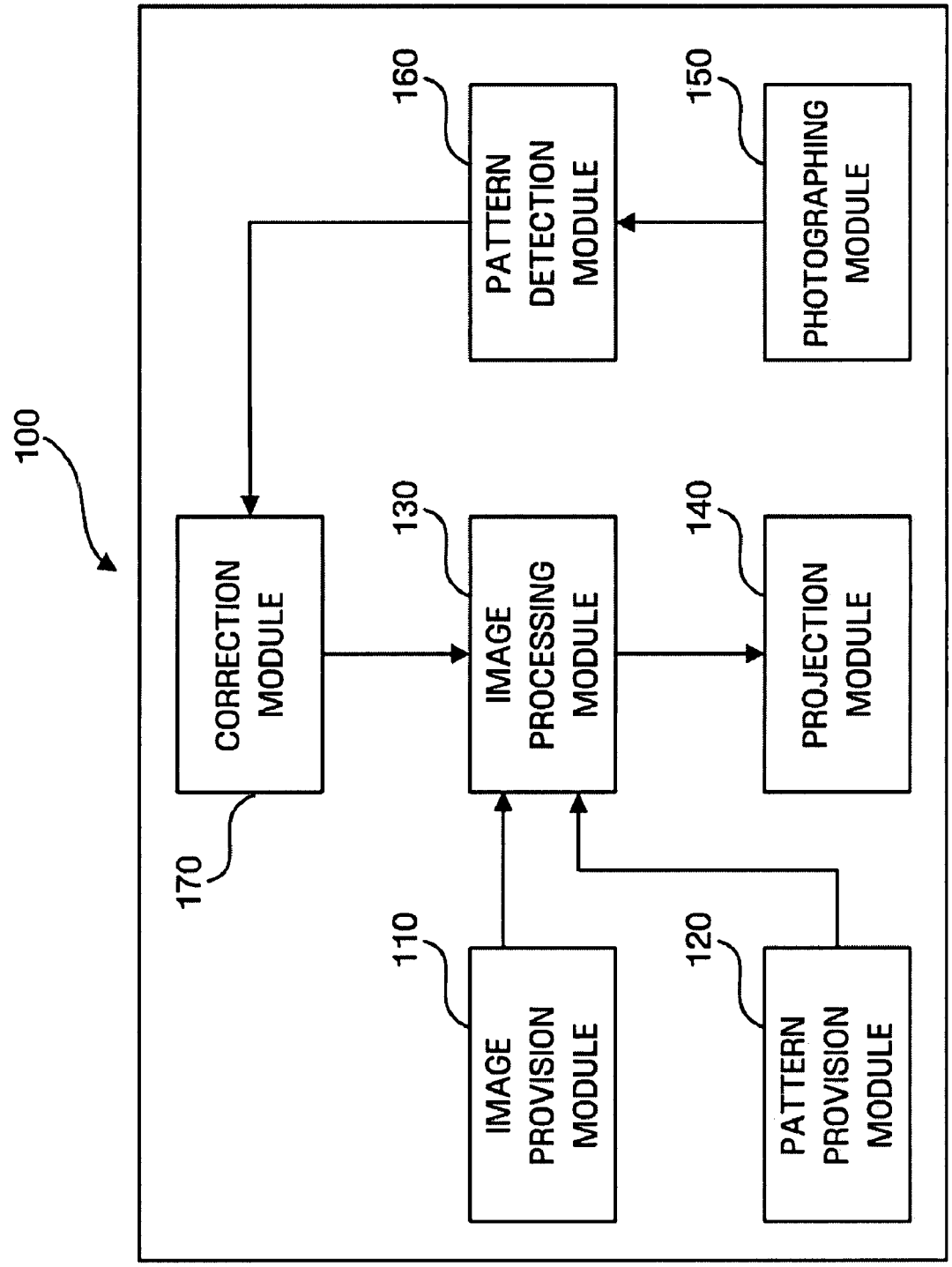
FIG. 1 illustrates an image correction apparatus, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates an image correction apparatus 100 according to an embodiment of the present invention. Referring to FIG. 1, the image correction apparatus 100 may include an image provision module 110, a pattern provision module 120, an image processing module 130, a projection module 140, a photographing module 150, a pattern detection module 160, and a correction module 170, for example.

The image provision module 110 may provide a plurality of image frames that are to be projected. The image frames may include still and moving images. For a moving image, the image provision module 110 may provide a plurality of temporally consecutive image frames, for example. In the case of a still image, the image provision module 110 may repeatedly provide an identical image frame.

The pattern provision module 120 provides patterns that are to be added to the image frames provided by the image provision module 110. The patterns may denote information used to correct the possible distortion of an image displayed on a projection surface due to, for example, the color or geometric shape of the projection surface onto which the image frames are to be projected. Patterns according to embodiments of the present invention will now be described in more detail with reference to FIGS. 2A through 11.

Figure 2A:
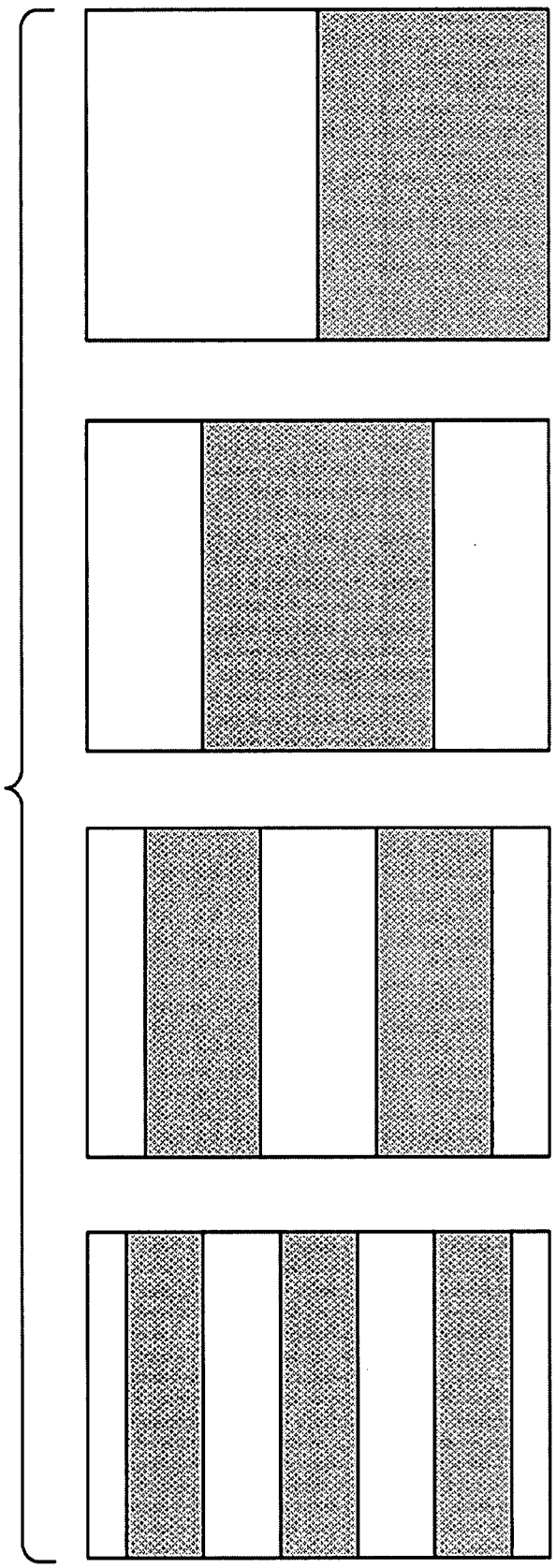
FIGS. 2A and 2B illustrate geometric patterns, according to an embodiment of the present invention.
Figure 2B:
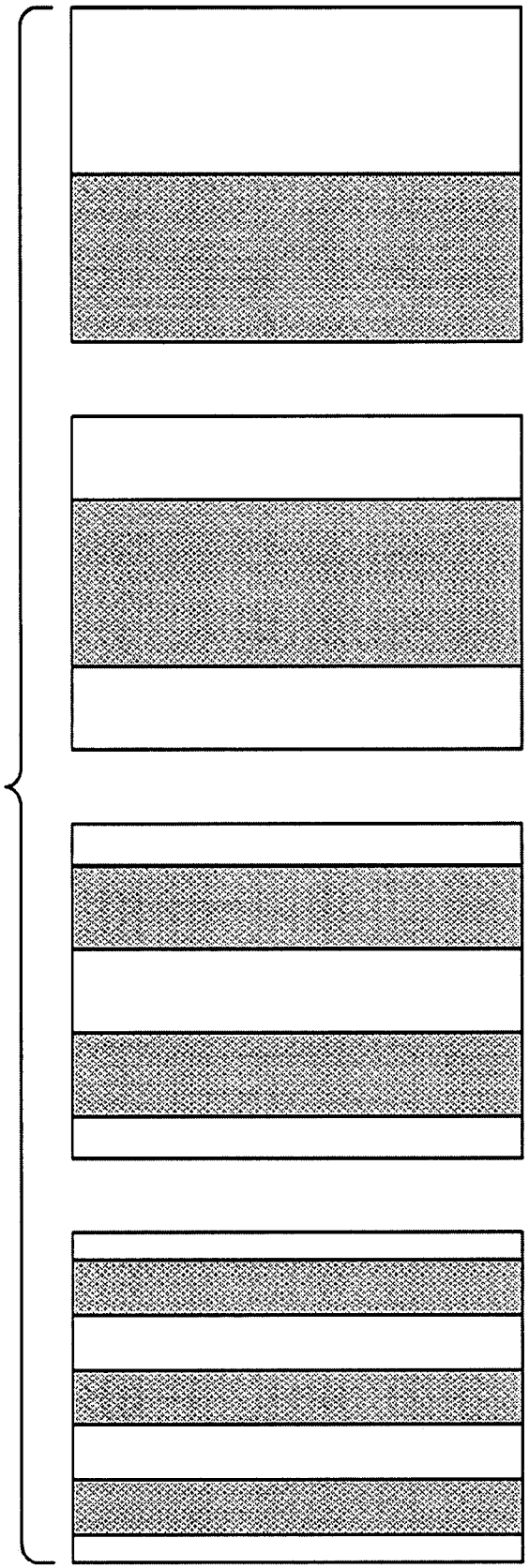

FIGS. 2A and 2B illustrate geometric patterns according to an embodiment of the present invention. A geometric pattern can be used to obtain three-dimensional (3D) geometry of a projection surface and compensate for a geometric distortion which may occur in a projected image frame, for example. The geometric pattern may have a predetermined geometric structure, and embodiments of the geometric structure are illustrated in FIGS. 2A and 2B. The geometric pattern illustrated in FIG. 2A or 2B is a gray code pattern that codes a projection surface using $2^n$ bits. Here, n indicates the number of different frequency pattern images. For modeling simplicity of characteristics of the projection surface, the geometric pattern may have a horizontal structure as illustrated in FIG. 2A or a vertical structure as illustrated in FIG. 2B. A horizontal or a vertical structure, or any combination of the two, may be used for 3D modeling of the projection surface. The structure of the geometric pattern is not limited to the above examples illustrated in FIGS. 2A and 2B.

The geometric pattern may be comprised of information regarding a grayish color or information regarding an increase or decrease of a luminance component, for example. Alternatively, the geometric pattern may be comprised of information regarding a Q component in a YIQ color space since a human visual system is insensitive to a change in the Q component. In FIGS. 2A and 2B, the gray code patterns are used as examples of the geometric patterns. However, the present invention is not limited thereto. That is, various forms of geometric patterns may be used in order to detect the geometric characteristics of the projection surface.

Figure 3A:
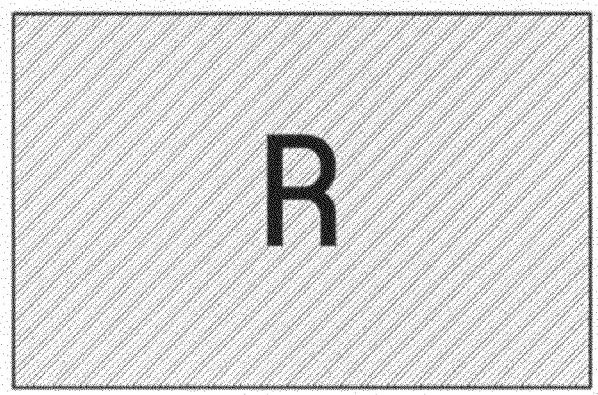
FIGS. 3A through 3C illustrate radiometric patterns, according to an embodiment of the present invention.
Figure 3B:
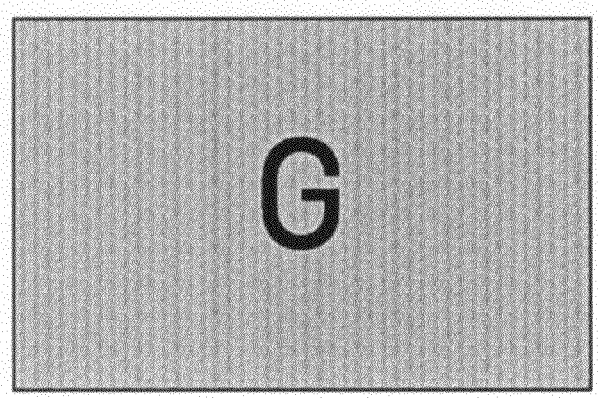
Figure 3C:
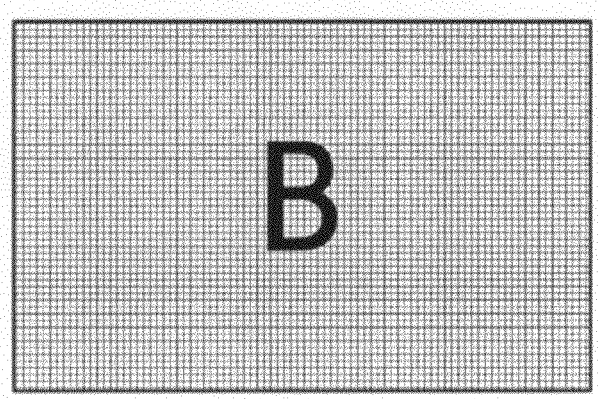

FIGS. 3A through 3C illustrate radiometric patterns according to an embodiment of the present invention. A radiometric pattern may be used to compensate for a color distortion, which may occur in an image frame projected onto a projection surface due to a unique color of the projection surface. In FIGS. 3A through 3C, three radiometric patterns including reference colors, i.e., red (R), green (G), and blue (B), respectively, are illustrated. However, the present invention is not limited thereto. The number of radiometric patterns or a type of a reference color included in each radiometric pattern may vary according to an embodiment.

As described above with reference to FIGS. 2A through 3C, a plurality of patterns (e.g. geometric and radiometric patterns) may be used to correct the geometric and color distortion of an image frame which is projected onto a projection surface. However, according to an embodiment of the present invention, one pattern (hereinafter, referred to as a complex pattern) including characteristics of both the geometric and radiometric patterns may also be used. The complex pattern may be comprised of objects having information regarding a plurality of reference colors (e.g., R, G, and B).

Figure 4:
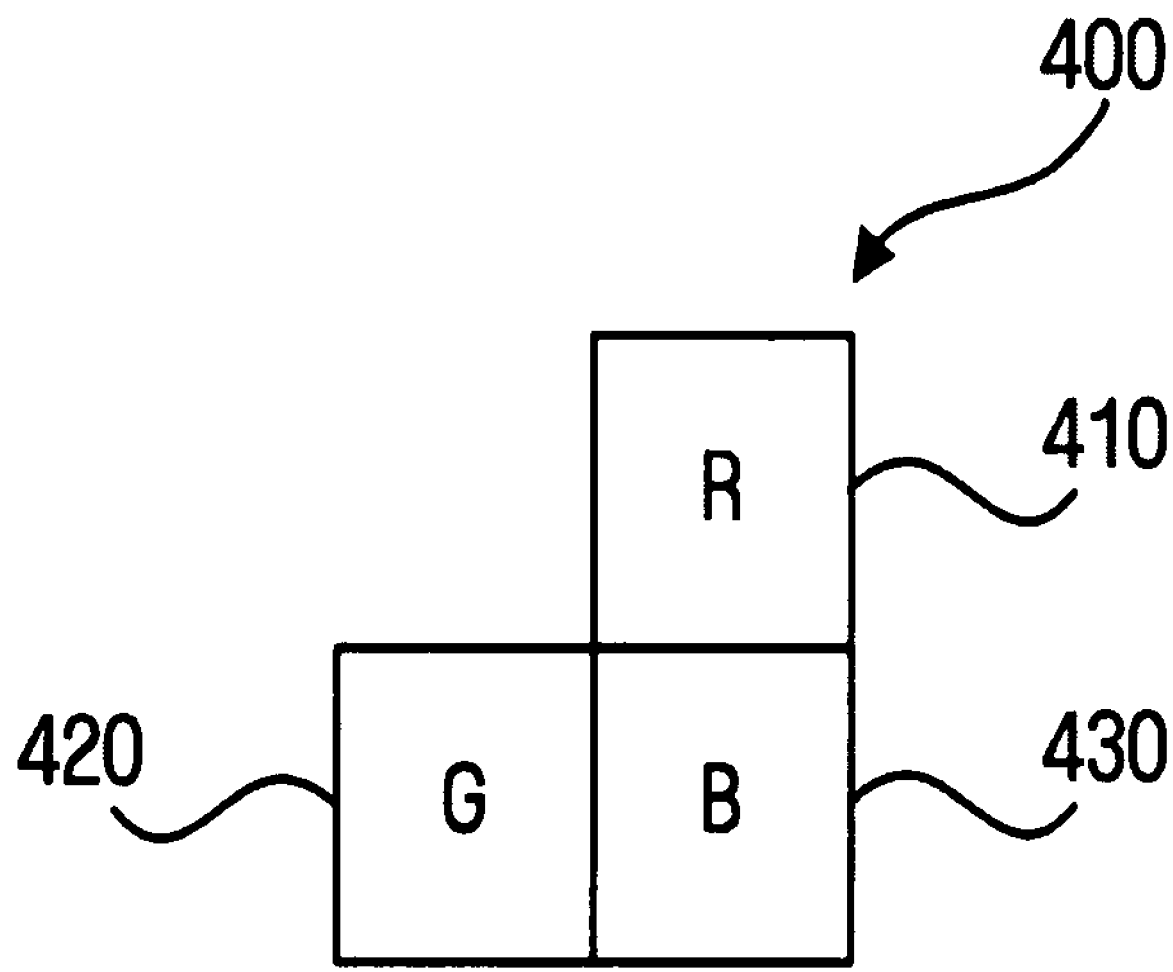
FIG. 4 illustrates an object, according to an embodiment of the present invention.
Figure 5:
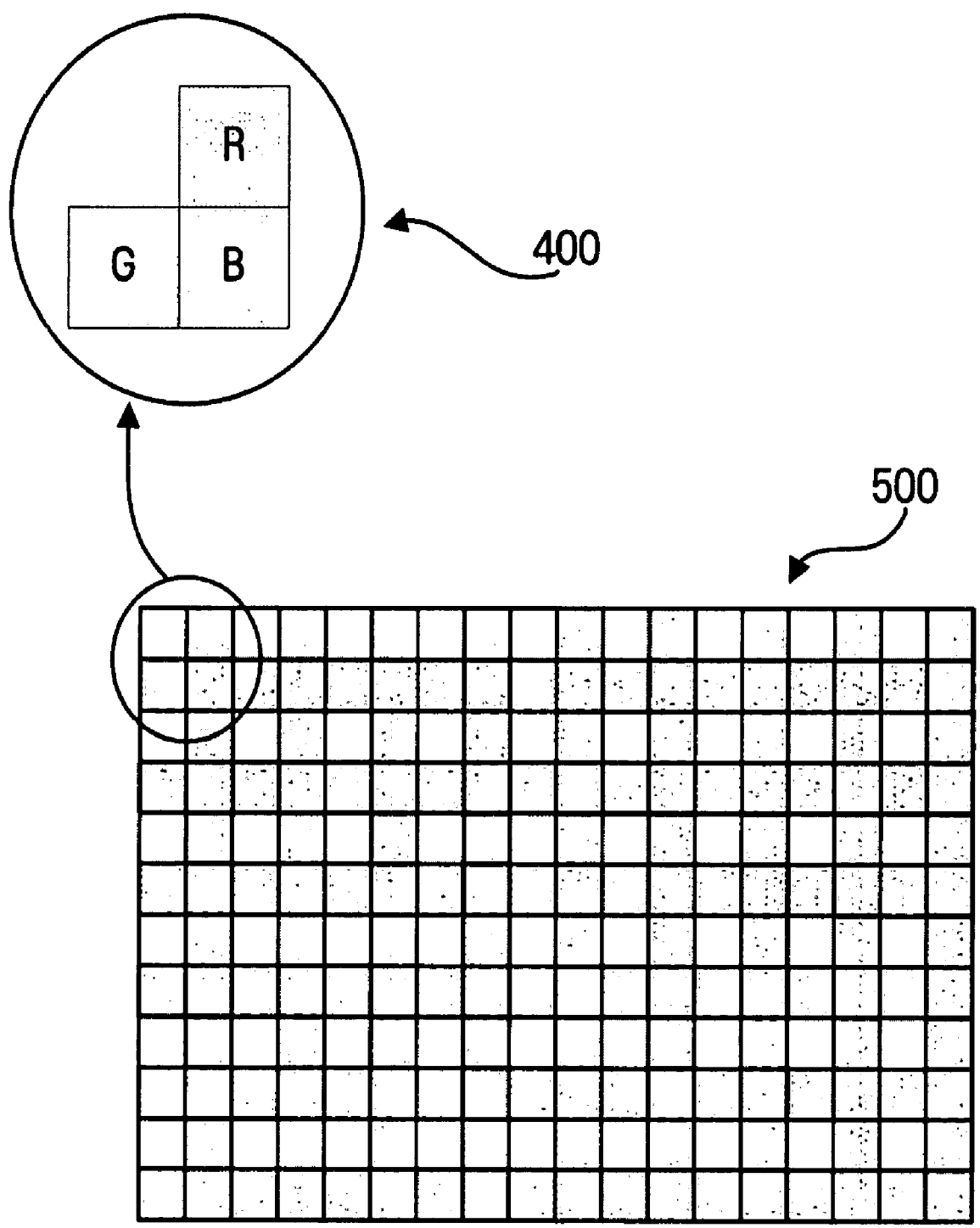
FIG. 5 illustrates a pattern, according to an embodiment of the present invention.

FIG. 4 illustrates an object 400 according to an embodiment of the present invention. The object 400 illustrated in FIG. 4 is a group of three pixels 410 through 430 arranged in a 'ᒲ' form. The three pixels 410 through 430 have R, G and B values, respectively. FIG. 5 illustrates a complex pattern 500 comprised of a plurality of the objects 400 of FIG. 4.

Figure 6:
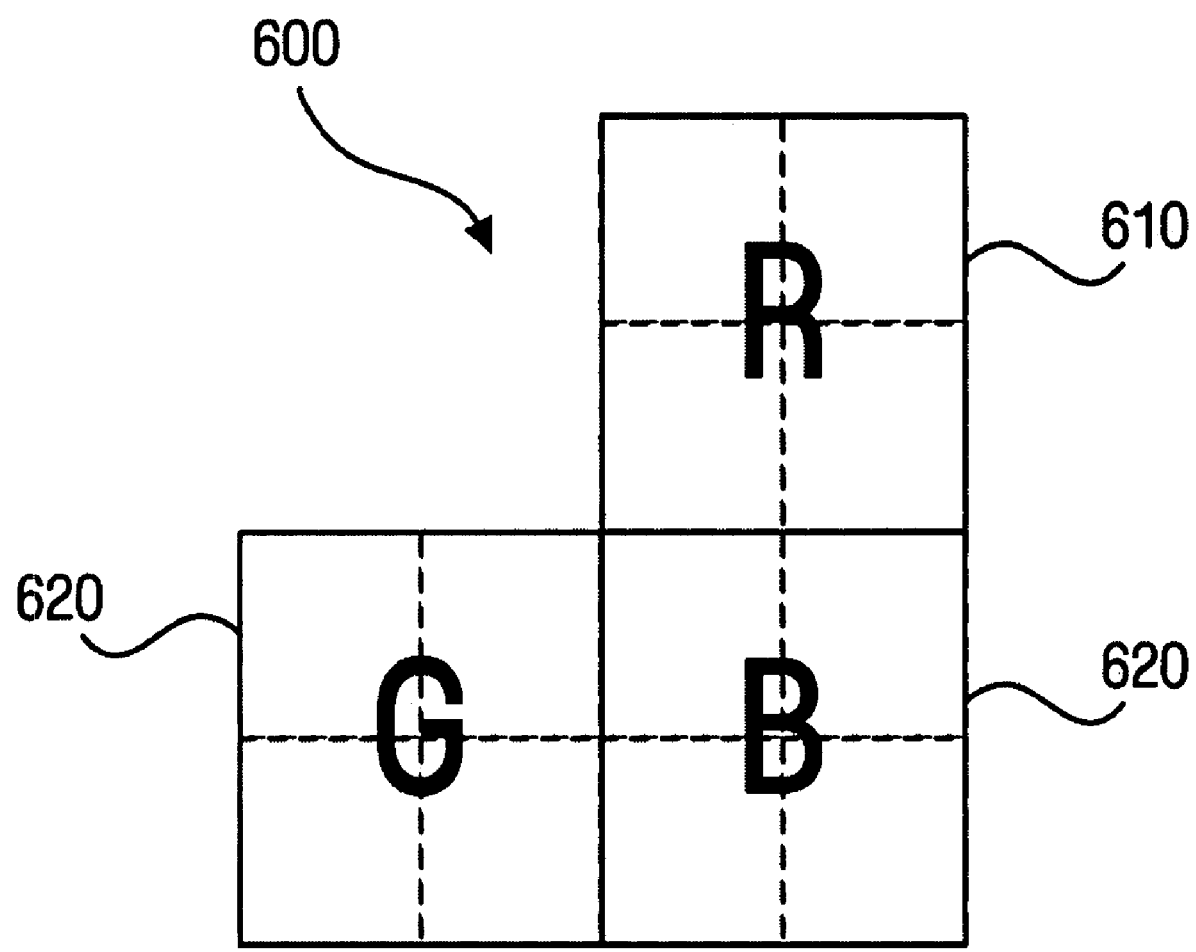
FIG. 6 illustrates an object, according to an embodiment of the present invention.

The shapes, colors, sizes and arrangements of objects included in a complex pattern may vary according to an embodiment. For example, an object 600, which is an enlarged version of the object 400 of FIG. 4, is illustrated in FIG. 6. The object 600 includes three squares 610 through 630 arranged in a 'ᒲ' form, although other arrangements and shapes may be used, and each of the three squares 610 through 630 is comprised of four pixels. The squares 610 through 630 respectively have predetermined R, G and B values.

The pattern provision module 120 may be synchronized with the image provision module 110. Therefore, when the image provision module 110 provides an image frame, the pattern provision module 120 may also provide a pattern. That is, whenever the image provision module 110 provides an image frame, the pattern provision module 120 may provide a pattern corresponding to the image frame, for example. The pattern provision module 120 may provide two types of patterns—a reference pattern and an offset pattern. The reference pattern and the offset pattern respectively correspond to two consecutive image frames. While the reference pattern and the offset pattern corresponding to the reference pattern have an identical geometric form, they typically have contrary color information.

According to an embodiment of the present invention, color information of the reference pattern and that of the offset pattern may be in a complementary color relationship. For example, three reference patterns 710a through 710c illustrated in FIG. 7 have color information of R, G and B, respectively, as an example. In addition, offset patterns 720a through 720c respectively corresponding to the reference patterns 710a through 710c have color information of cyan (C), magenta (M) and yellow (Y), as an example, which are complementary colors of R, G and B of the reference patterns 710a through 710c.

Figure 7:
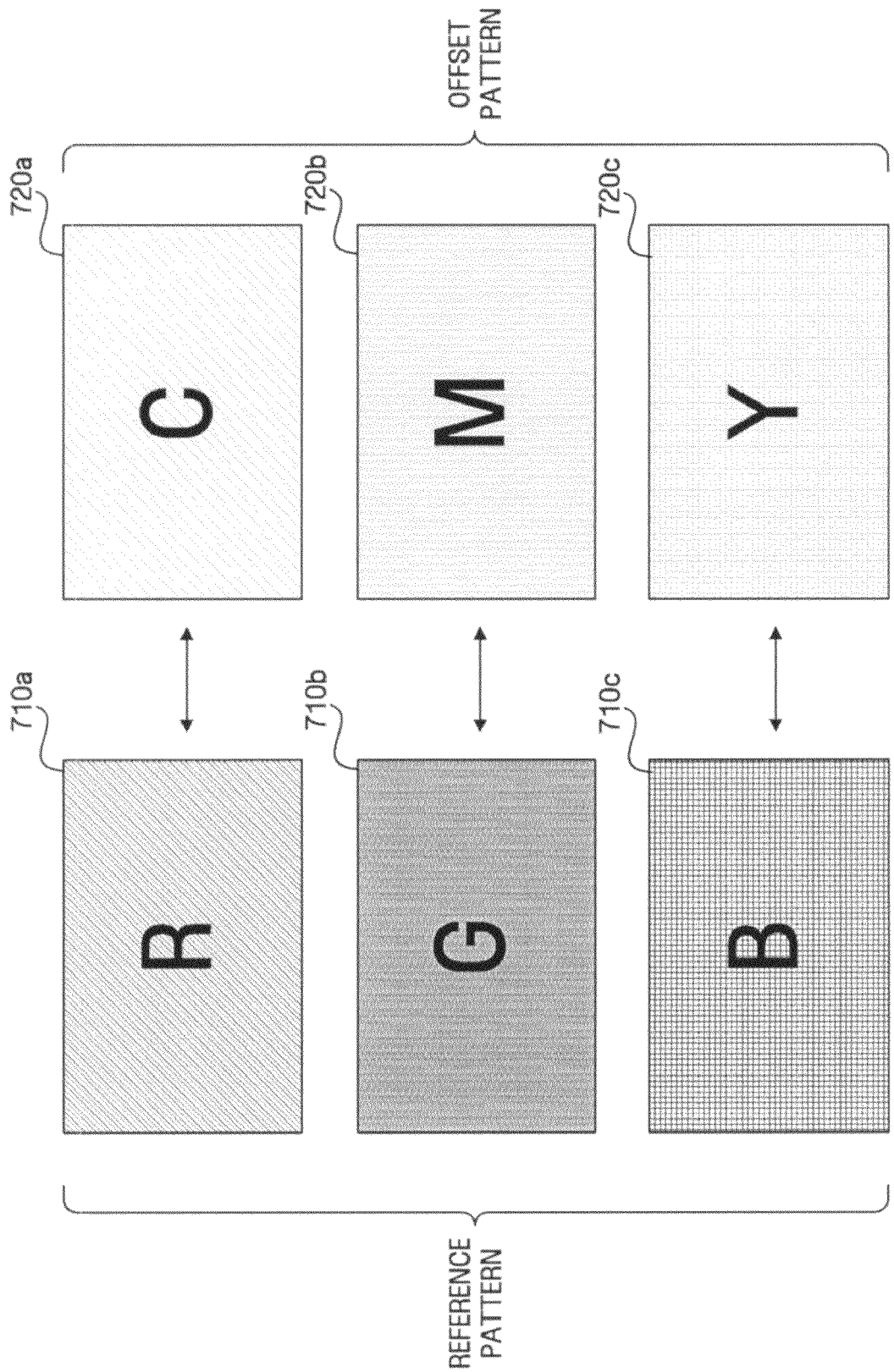
FIG. 7 illustrates reference and offset patterns of a radiometric pattern, according to an embodiment of the present invention.
Figure 8:
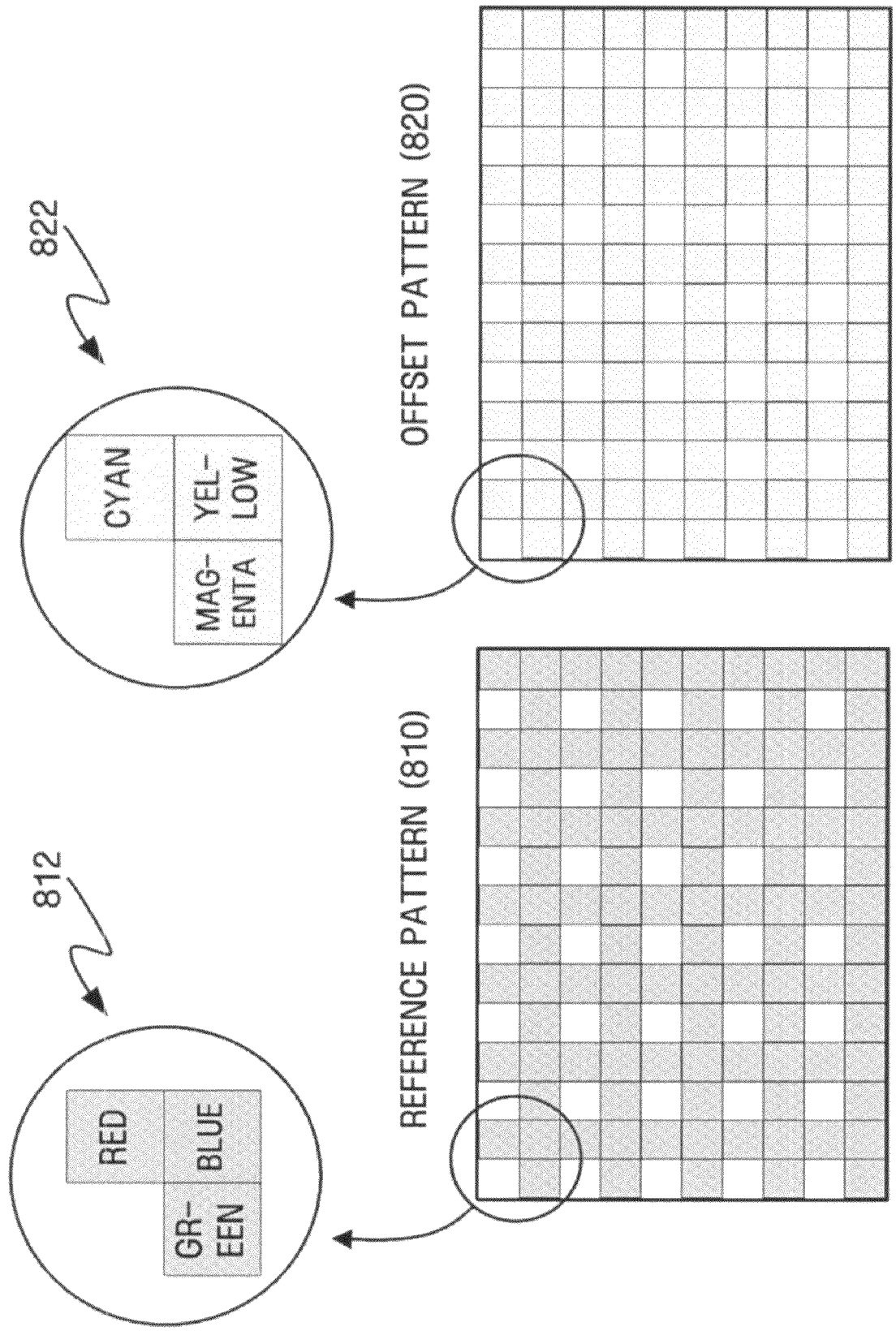
FIG. 8 illustrates reference and offset patterns of a complex pattern, according to an embodiment of the present invention.

FIG. 7 illustrates reference and offset patterns implemented for a radiometric pattern described above with reference to FIGS. 3A through 3C according to an embodiment of the present invention. Reference and offset patterns for the complex pattern 500 described above with reference to FIG. 5 may also be implemented in a similar manner. For example, referring to FIG. 8, a reference pattern 810 may be comprised of objects 812, each including color information of R, G and B. Objects 822 that form an offset pattern 820 and the objects 812 that form the reference pattern 810 have identical sizes, forms, and arrangement structures. However, the color information of the objects 822 of the offset pattern 820 typically has a complementary color relationship with that of the objects 812 of the reference pattern 810.

Figure 9:
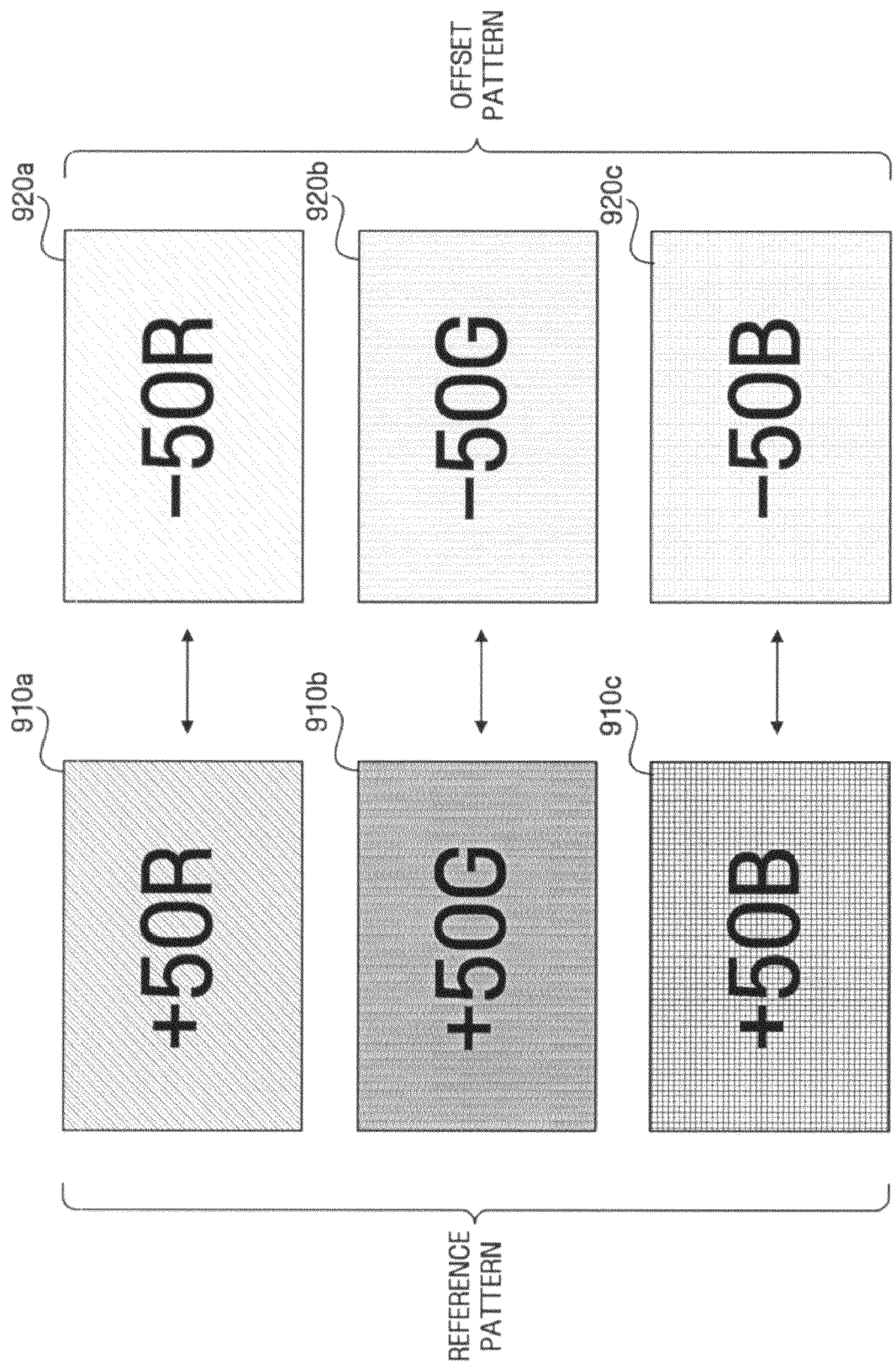
FIG. 9 illustrates reference and offset patterns of a radiometric pattern, according to an embodiment of the present invention.
Figure 10:
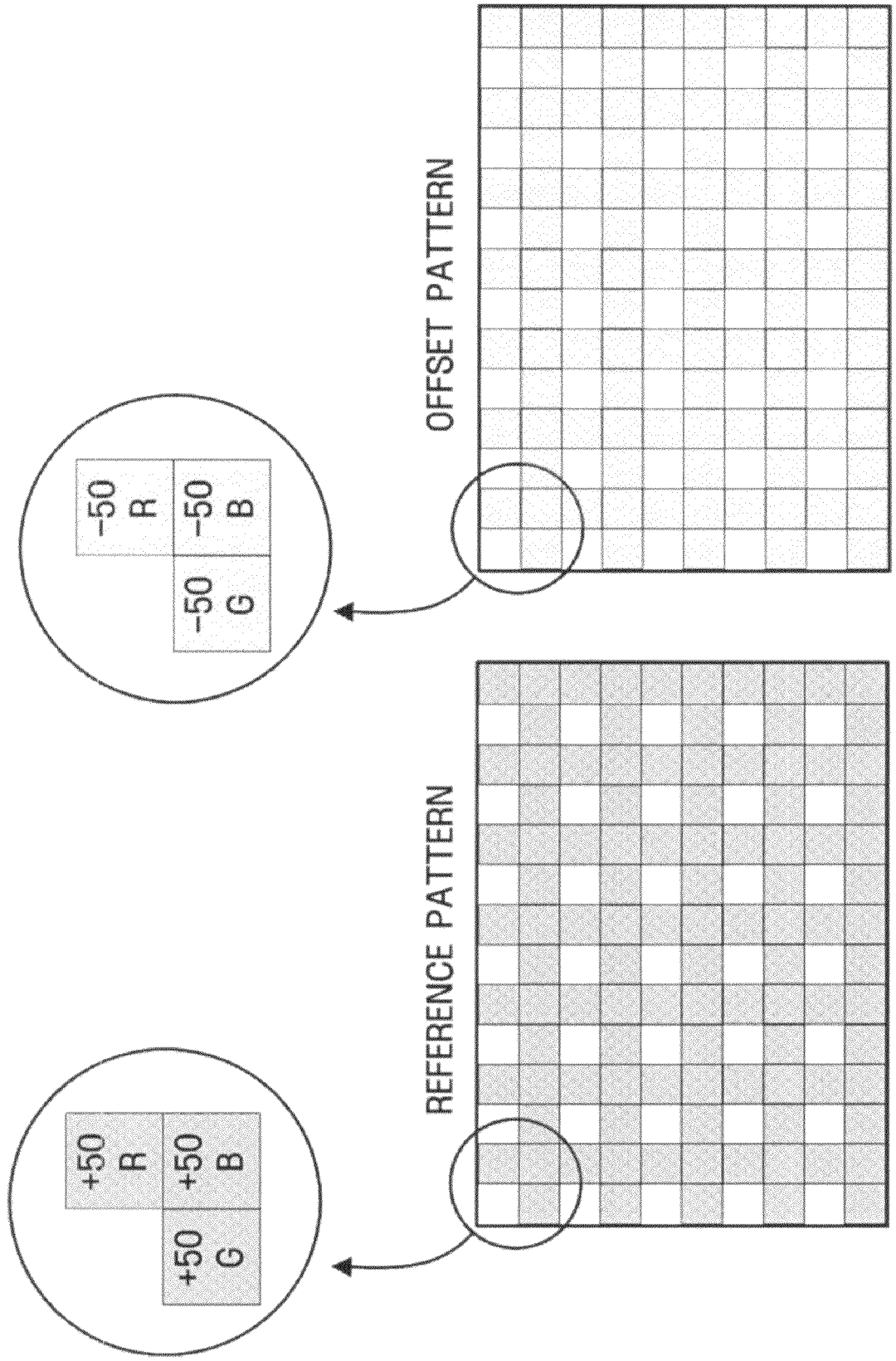
FIG. 10 illustrates reference and offset patterns of a complex pattern, according to an embodiment of the present invention.

According to an embodiment of the present invention, color information of a reference pattern and that of an offset pattern may include information regarding an increase or decrease in a reference color. The information regarding an increase or decrease in a reference color included in the color information of the reference pattern is contrary to the information regarding an increase or decrease in a reference color included in the color information of the offset pattern. For example, as illustrated in FIG. 9, if color information of reference patterns 910a through 910c includes information indicating an increase of 50, for example, in one of R, G and B values, which are reference colors, color information of offset patterns 920a through 920c may include information indicating a decrease of 50 in one of R, G and B values for pixels located at the same positions as the reference patterns 910a through 910c. This relationship between a reference pattern and an offset pattern may similarly be applied to any pattern such as the complex pattern described above with reference to FIG. 5. An embodiment of such application is illustrated in FIG. 10.

As described above with reference to FIGS. 2A and 2B, a geometric pattern may also be classified into a reference pattern and an offset pattern. For example, referring to FIG. 11, a reference pattern 1110 of a geometric pattern may be comprised of information regarding an increase or decrease of a Q component in a YIQ color domain, an offset pattern 1120 corresponding to the reference pattern 1110 may be comprised of contrary information regarding an increase or decrease of the Q component.

Since information that forms a reference pattern is different from information that forms an offset pattern as described above, if the reference pattern and the offset pattern are projected onto the same position, they offset each other. Consequently, a viewer may recognize nothing, i.e. as if no pattern was projected.

Referring back to FIG. 1, the image processing module 130 may synthesize the image frames provided by the image provision module 110 with the patterns provided by the pattern provision module 120. That is, the image processing module 120 may embed the received patterns in the image frames. For example, an $i^{th}$ pixel of an image frame may contain color information representing a synthesis of R with a color level of 20, G with a color level of 30, and B with a color level of 120. In this case, if a pattern provided by the pattern provision module 120 includes information indicating an increase of 50 in the color level of R for the $i^{th}$ pixel of the image frame, the $i^{th}$ pixel of the image frame processed by the image processing module 130 may contain color information representing a synthesis of R with a color level of 70, G with a color level of 30, and B with a color level of 120.

The image processing module 130 may insert the reference and offset patterns into the consecutive image frames in an alternating fashion. Specifically, the image frames may be divided into odd frames and even frames, for example. Then, the reference patterns may be inserted into the odd frames, and the offset patterns may be inserted into the even frames. In another embodiment, if an output time of an image frame is T, the image processing module 130 may insert a reference pattern during the initial T/2 for outputting the image frame, and insert the offset pattern during the remaining T/2 for outputting the same image frame.

According to an embodiment of the present invention, a coding method used by the image processing module 130 to synthesize an image frame with a pattern may be divided into a temporal encoding method and a spatial encoding method. Here, a coding method used by the image processing module 130 may determine the type of pattern required. Therefore, the pattern provision module 120 may provide a pattern corresponding to a coding method used by the image processing module 130. The temporal encoding method and the spatial encoding method will now be described with reference to FIGS. 12 through 14.

Figure 12:
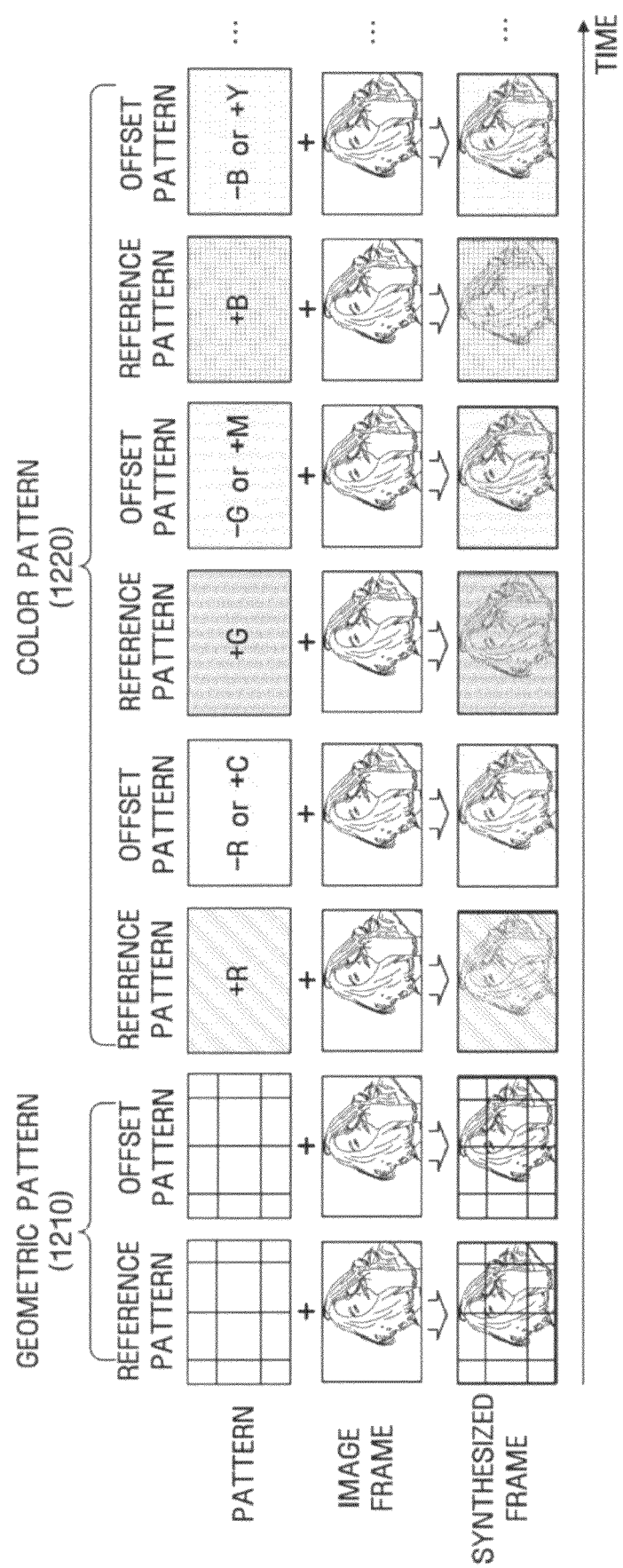
FIG. 12 illustrates a process of synthesizing a pattern with an image frame, according to an embodiment of the present invention.

FIG. 12 illustrates a temporal encoding process performed by the image processing module 130, according to an embodiment of the present invention. In the temporal encoding process, the image processing module 130 may sequentially synthesize a geometric pattern 1210 and a color pattern 1220, provided by the pattern provision module 120, with temporally consecutive image frames. Each of the geometric pattern 1210 and the color pattern 1220 may include a reference pattern and an offset pattern. The image processing module 130 may insert the reference and offset patterns into the image frames in an alternating fashion, for example.

Figure 11:
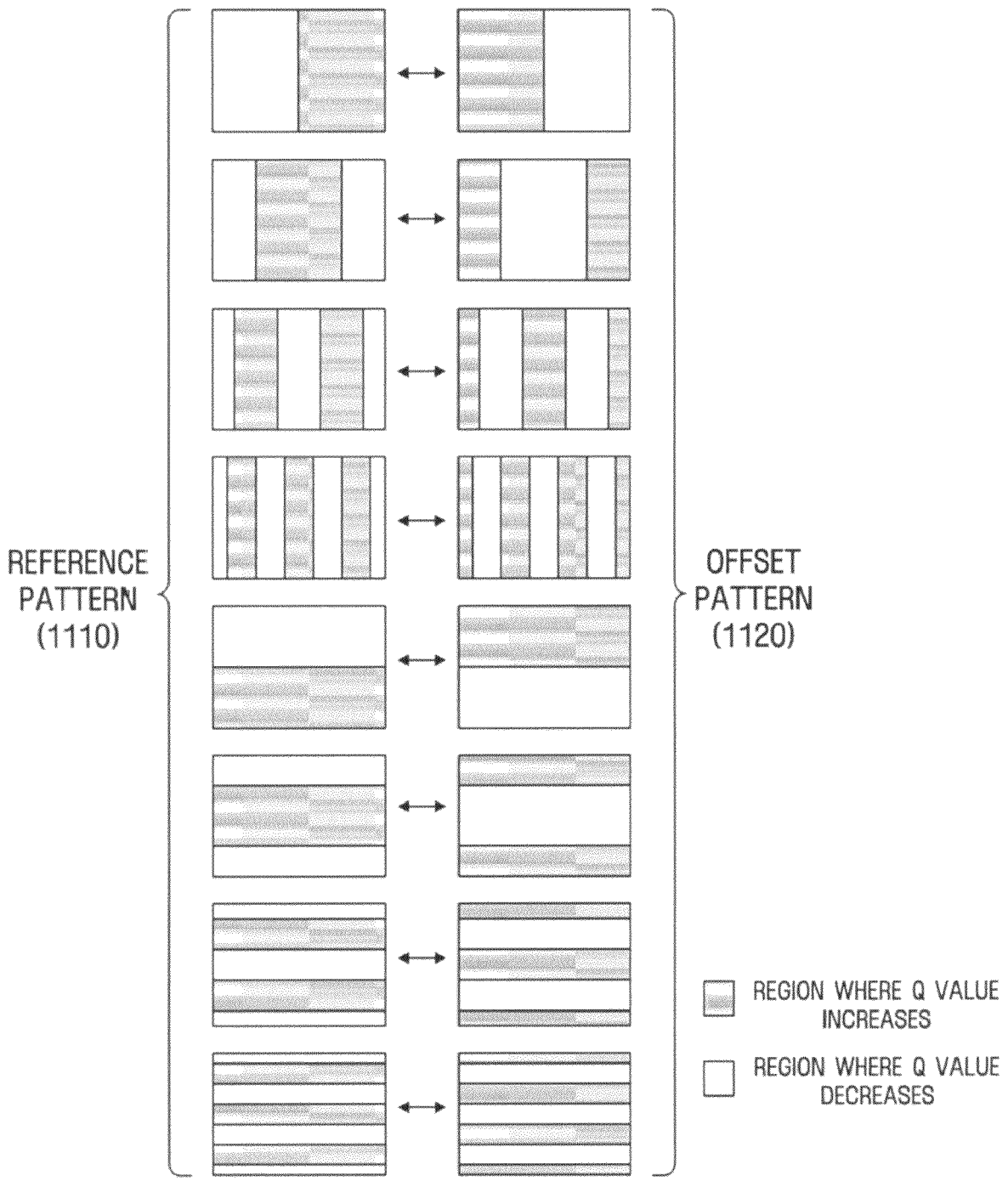
FIG. 11 illustrates reference and offset patterns of a geometric pattern, according to an embodiment of the present invention.
Figure 13:
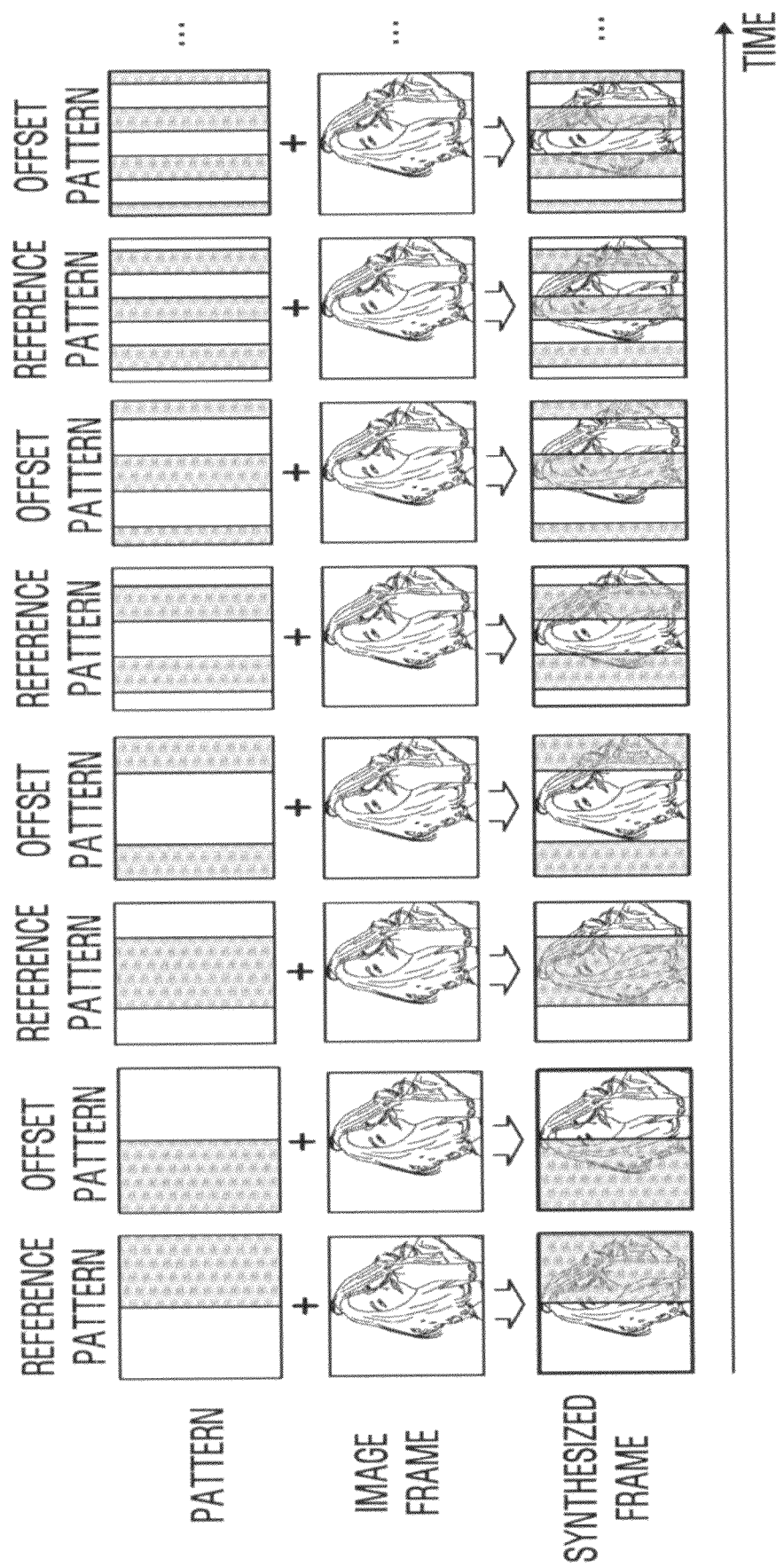
FIG. 13 illustrates a process of synthesizing a geometric pattern with an image frame, according to an embodiment of the present invention.

In FIG. 12, the geometric pattern 1210 may include one reference pattern and one offset pattern. However, the present invention is not limited thereto. For example, a plurality of gray code patterns may be used as the geometric pattern 1210, as illustrated in FIG. 11. In this case, a plurality of geometric patterns may respectively be inserted into consecutive image frames as illustrated in FIG. 13. Here, a reference pattern and an offset pattern corresponding to the reference pattern may also be inserted into the image frames in an alternating fashion. In FIG. 13, the geometric patterns having a vertical structure are inserted into the consecutive image frames, respectively. However, geometric patterns having a horizontal structure may also be inserted into the consecutive image frames, respectively, as illustrated in FIGS. 2B and 11.

In FIGS. 12 and 13, a pattern set, which includes a plurality of geometric patterns and a plurality of color patterns, is synthesized with image frames. However, embodiments of the present invention are not limited thereto. For example, a pattern may repeatedly be synthesized with image frames. In this case, even when there are changes in geometric or color characteristics of a projection surface, the image frames may be corrected by reflecting the changes, which will be described in greater detail herein below.

Figure 14:
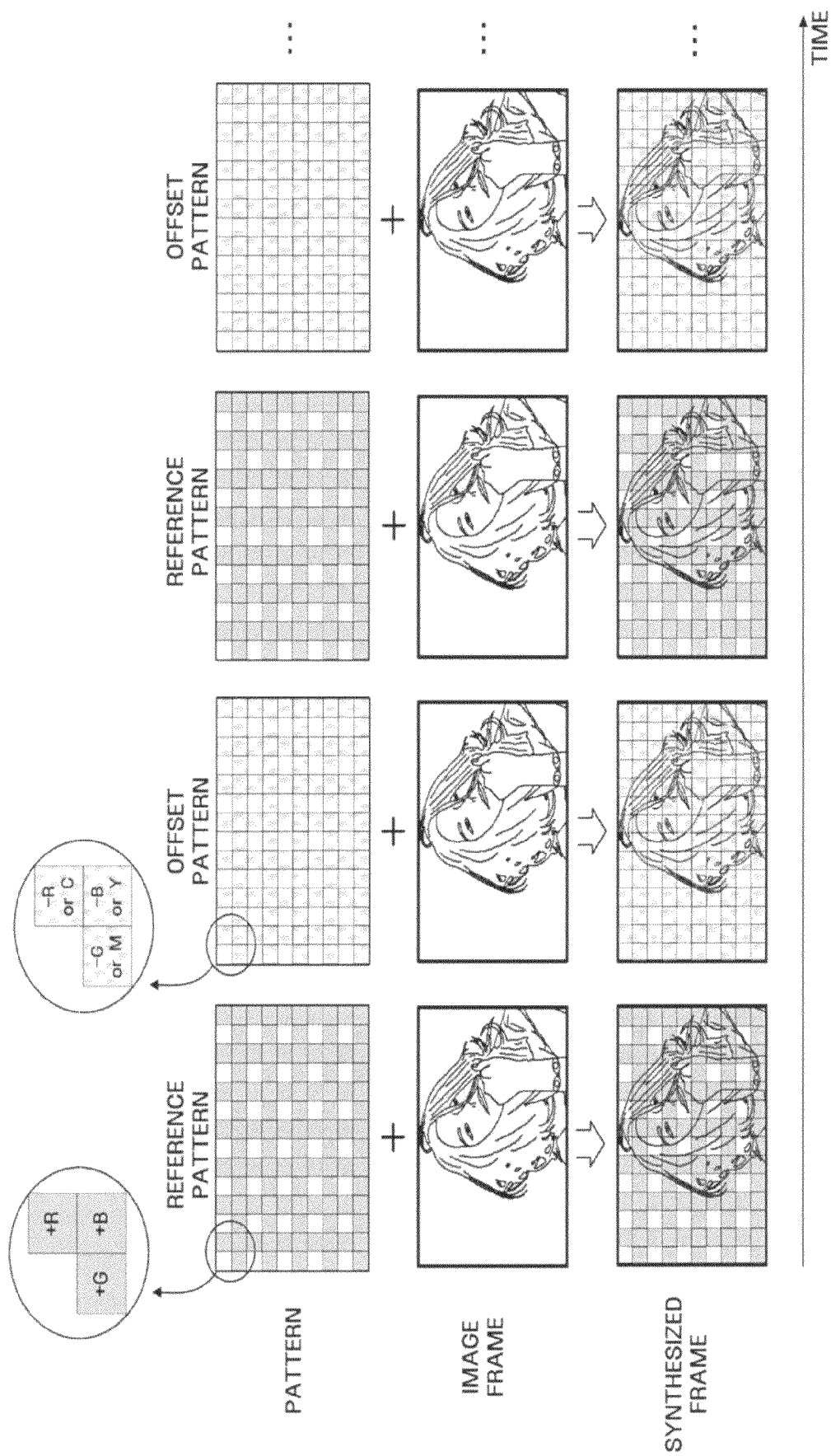
FIG. 14 illustrates a process of synthesizing a complex pattern with an image frame, according to an embodiment of the present invention.

FIG. 14 illustrates a spatial encoding process performed by the image processing module 130, according to an embodiment of the present invention. In the spatial encoding process, the image processing module 130 may insert a complex pattern provided by the pattern provision module 120 into image frames, for example. In this case, a reference pattern and an offset pattern corresponding to the reference pattern may also be inserted into the image frames in an alternating fashion.

When the temporal encoding method is used, characteristics of a projection surface can be identified more precisely. Therefore, the efficiency of correcting the distortion of a projected image frame can be enhanced. When the spatial encoding method is used, since a small number of patterns are required, the image frame may be corrected in real time even if the characteristics of the projection surface change dynamically.

The image processing module 130 may also reflect correction information, which is based on the geometric and color characteristics of the projection surface and provided by the correction module 170, in the image frame, for example.

Referring back to FIG. 1, the projection module 140 may project the image frames processed by the image processing module 130 onto a predetermined projection surface. Any surface, such as a screen, a curtain or a wall, can be the projection surface regardless of its properties, so long as it is located at a position upon which the image frames may be projected. Therefore, the projection surface need not necessarily be flat. Instead, the projection surface may be curved, for example, or the projection surface may have various colors.

The image frames projected by the projection module 140 may include reference and offset patterns alternately added thereto. However, since the projection speed of the image frames is high, the reference and offset patterns included in the image frames may be offset by each other due to human visual characteristics. Hence, a user may not be able to recognize the reference and offset patterns. For example, it may be assumed that an R value of an $i^{th}$ pixel in an odd frame of an $n^{th}$ image frame has been increased by 50 due to a reference pattern and that an R value of an $i^{th}$ pixel in an even frame of the $n^{th}$ image frame has been decreased by 50 due to an offset pattern. In this case, if the odd and even frames of the $n^{th}$ image frame are consecutively projected to the same position of the projection surface, the user cannot perceive an increase or decrease in the R value of the $i^{th}$ pixel of the $n^{th}$ image frame due to a residual effect.

The photographing module 150 may photograph the image frames projected onto the projection surface and may provide the photographed image frames to the pattern detection module 160, for example. The photographing module 150 may be synchronized with the projection module 140, and thus may photograph each of the image frames projected by the projection module 140. Therefore, the reference and offset patterns, which were offset by each other due to the human visual characteristics and thus were unrecognizable by the user, may be captured by the photographing module 150. A photographed image frame may be divided into a reference pattern and an offset pattern. The photographing module 150 may include image capturing devices, such as a charge coupled device (CCD) and a complementary metal-oxide semiconductor (CMOS), for example, in order to photograph the projected image frames.

The pattern detection module 160 may detect a pattern image using the photographed image frames provided by the photographing module 150. To this end, the pattern detection module 160 may subtract two consecutive photographed image frames from each other, for example. Here, an original image frame may be offset from the two photographed image frames, and a pattern image remains as a result. The pattern image may have information corresponding to a difference value between the reference and offset patterns.

Figure 15:
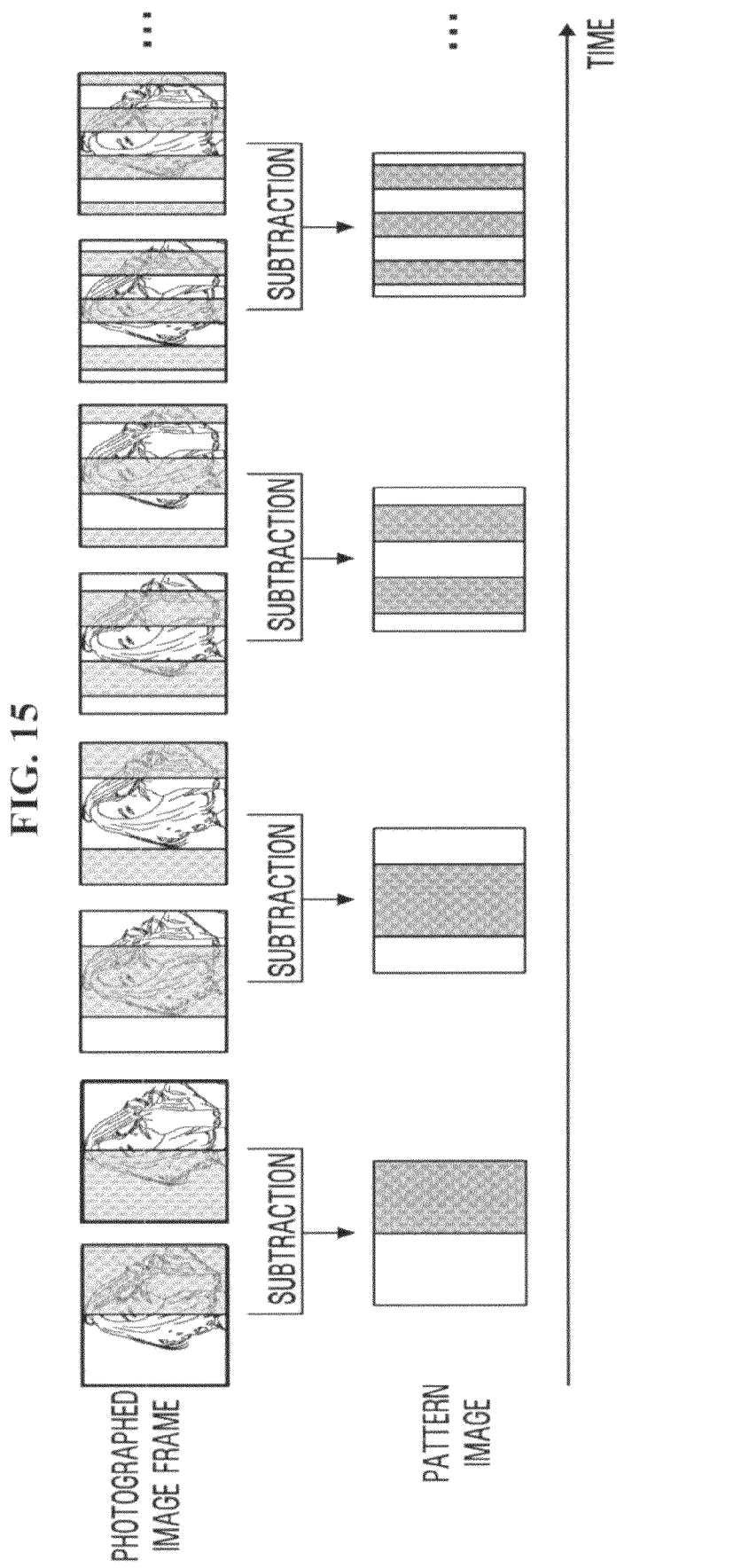
FIG. 15 illustrates a process of detecting a pattern image, according to an embodiment of the present invention.
Figure 16:
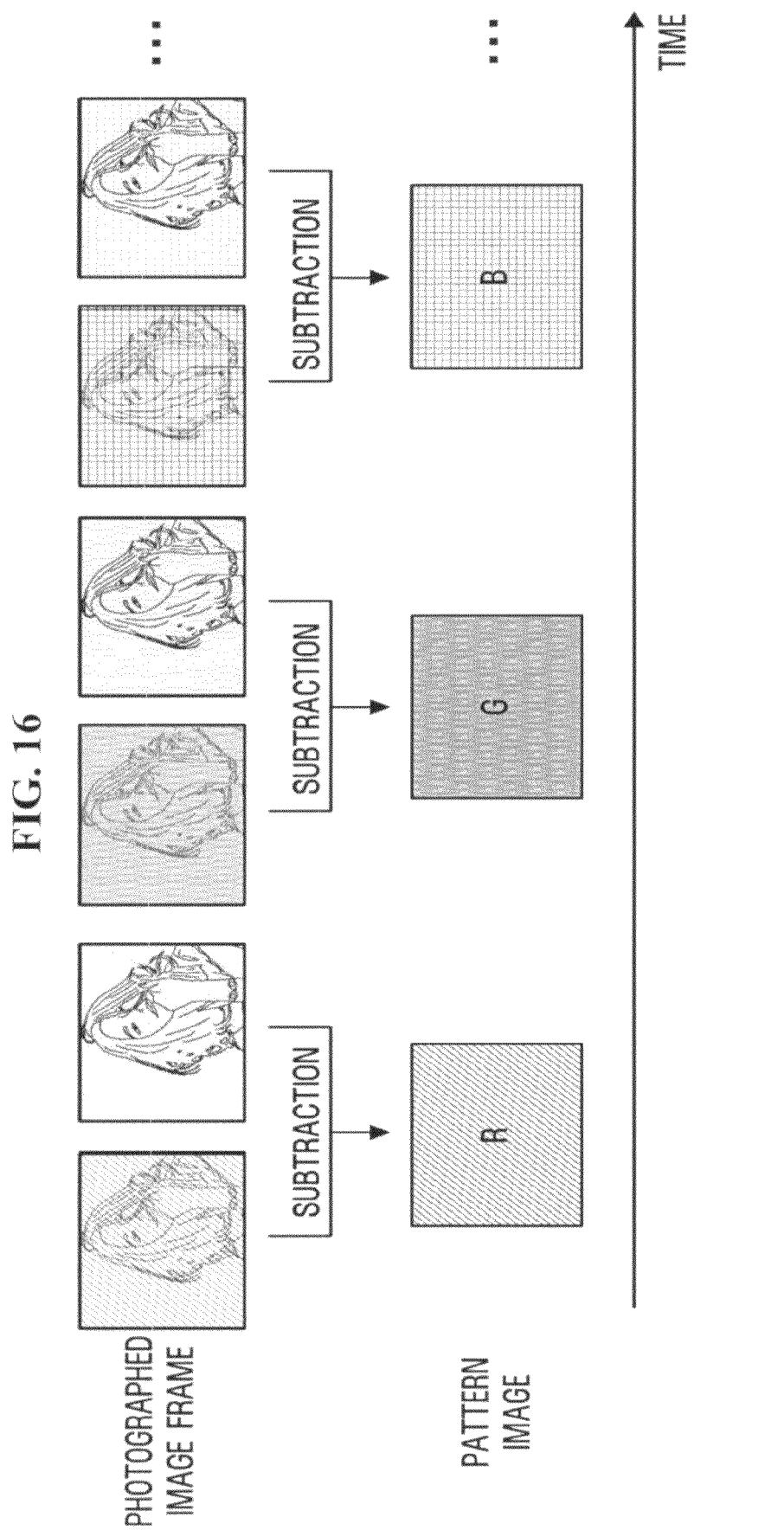
FIG. 16 illustrates a process of detecting a pattern image, according to an embodiment of the present invention.

When the temporal encoding method is used, a pattern image including a geometric pattern and a pattern image including a color pattern may be detected independently. For example, when "synthesized frames," illustrated in FIG. 13, are projected onto the projection surface, photographed image frames including reference patterns may be subtracted from photographed image frames that include offset patterns corresponding to the reference patterns among photographed image frames obtained after the synthesized frames are photographed. When this occurs, the subtraction results may be as illustrated in FIG. 15. In addition, when "synthesized frames," which are illustrated in FIG. 12 and into which color patterns are inserted, are projected onto the projection surface, if photographed image frames including reference patterns are respectively subtracted from photographed image frames including offset patterns among photographed image frames, obtained after the synthesized frames are photographed, the subtraction results are as illustrated in FIG. 16.

Figure 17:
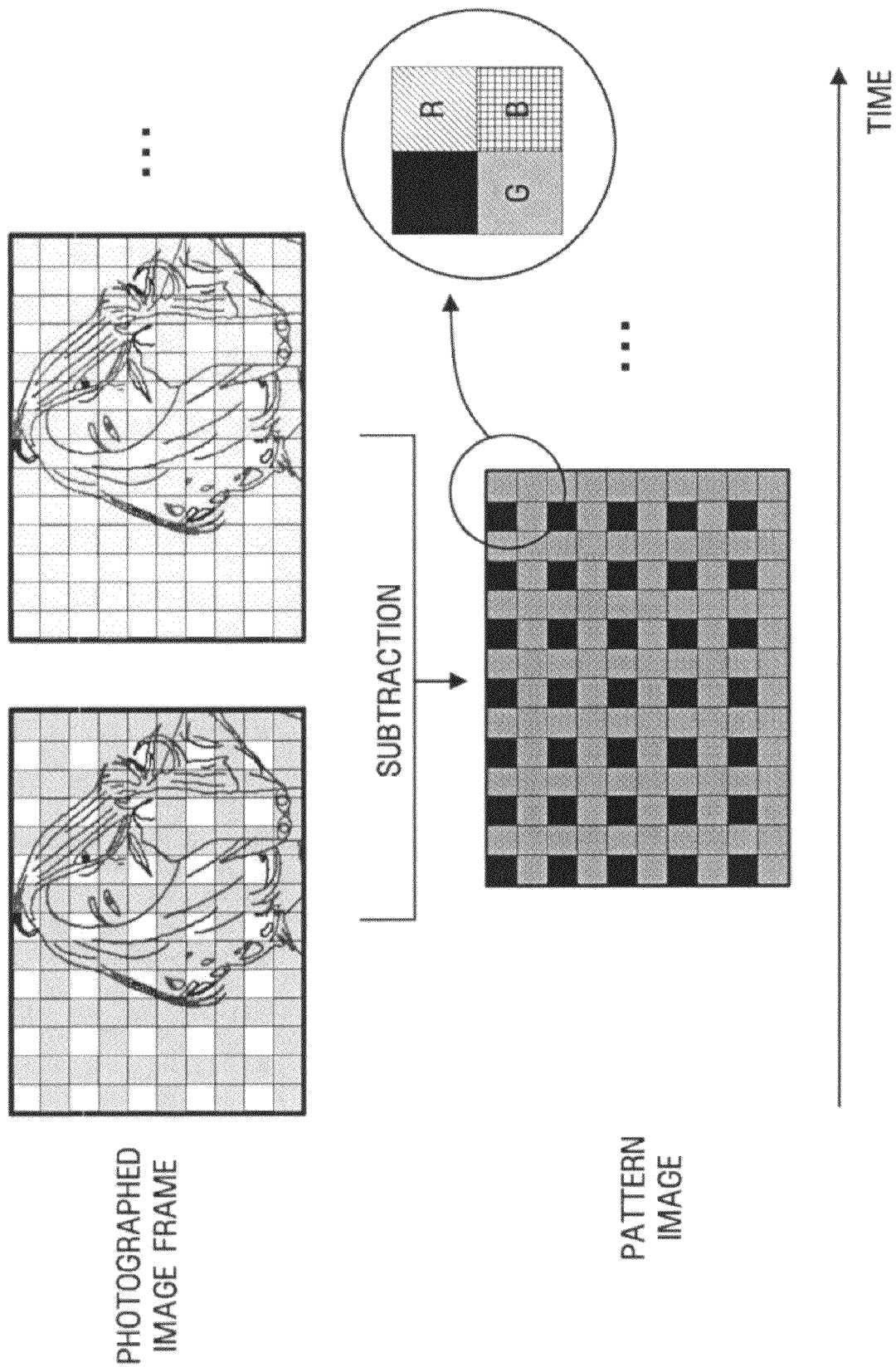
FIG. 17 illustrates a process of detecting a pattern image, according to an embodiment of the present invention.

When the spatial encoding method is used, a single pattern image including characteristics of both the geometric pattern and the offset pattern may be detected. For example, when "synthesized frames," illustrated in FIG. 14, are projected onto the projection surface, if photographed image frames including reference patterns are respectively subtracted from photographed image frames including offset patterns that correspond to the reference patterns among photographed image frames obtained after the synthesized frames are photographed, the subtraction results are as illustrated in FIG. 17.

The correction module 170 may model the characteristics of the projection surface using the pattern image detected by the pattern detection module 160. That is, the geometric and color characteristics of the projection surface may be calculated using the correction module 170, for example.

When the temporal encoding method is used, the geometric characteristics of the projection surface may be calculated using pattern images such as those illustrated in FIG. 15. The pattern images illustrated in FIG. 15 are gray code patterns, as an example. Since a technology for modelling 3D characteristics of a projection surface using a gray code pattern is known to those of ordinary skill in the art, a detailed description thereof will be omitted. As described above, there are various types of patterns that can be used to model the 3D characteristics of a projection surface, apart from a gray code pattern. Accordingly, various pattern images can be obtained from photographed image frames and can be applied to embodiments of the present invention in a similar way that the gray code pattern is applied to embodiments of the present invention.

When the temporal encoding method is used, the color characteristics of the projection surface may be calculated using pattern images such as those illustrated in FIG. 16. For example, if the color of a pattern image obtained from a photographed image frame, which is projected after a color pattern is inserted thereinto, is compared with a predetermined reference color, the color of the projection surface can be predicted. More specifically, a reference pattern may be set to increase a color level of R of an image frame by 50, and an offset pattern may be set to decrease the color level of R of a next image frame by 50. In this case, if the reference pattern is subtracted from the offset pattern, a pattern image having R with a color level of 100 as color information should be obtained. However, if a color level of R in a region of the pattern image detected by the pattern detection module 160 measures 120, it may be determined that the color of the projection surface corresponding to the region includes R with a color level of +20. This calculation process may be performed in units of pixels that form the pattern image, for example.

When the spatial encoding method is used, the color characteristics of the projection surface may be calculated using pattern images such as the one illustrated in FIG. 17. The spatial encoding method and the temporal encoding method may use similar methods of calculating the color characteristics of the projection surface. However, while an independent pattern image can be detected for each reference color using the temporal encoding method, only one pattern image including a plurality of reference color information can be detected using the spatial encoding method. Therefore, when the spatial encoding method is used, the characteristics of the projection surface may be analyzed based on a smaller number of pattern images. When the temporal encoding method is used, it is required to detect a greater number of pattern images than when the spatial encoding method is used. However, the characteristics of the projection surface can be analyzed more precisely when using the temporal encoding method than when using the spatial encoding method.

Figure 18:
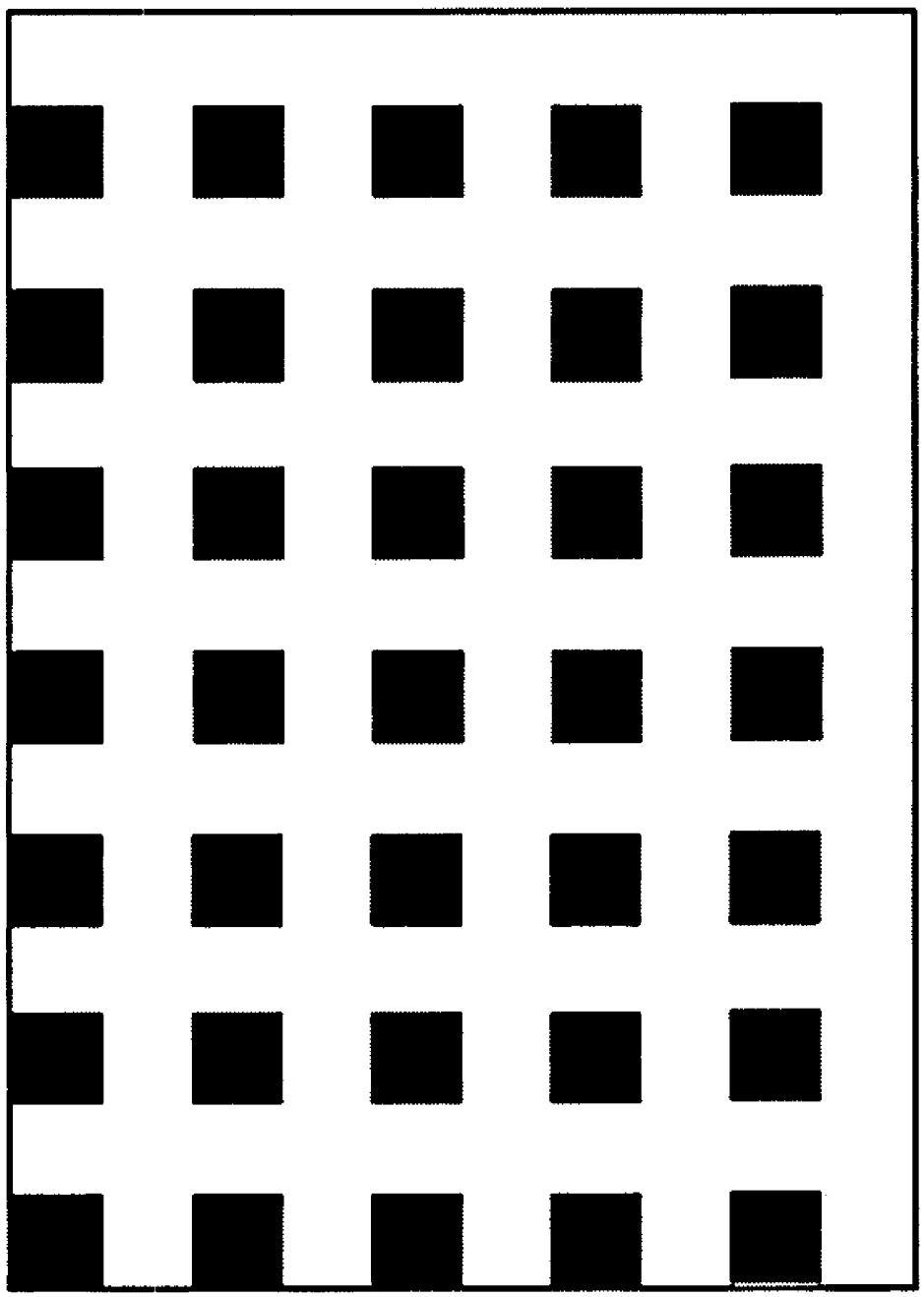
FIG. 18 illustrates a pattern image, according to an embodiment of the present invention.

When the spatial encoding method is used, the geometric and color characteristics of the projection surface may be calculated using the same pattern image. In order to calculate the geometric characteristics, color information included in the pattern image may be filtered out. For example, when the pattern image illustrated in FIG. 17 is detected, if color information is filtered from the pattern image, a pattern image 1800 illustrated in FIG. 18 can be obtained. The geometric characteristics of the projection surface may be calculated by comparing the pattern image 1800 with a pre-stored pattern. For example, measurement points in the pattern image 1800 are determined. Then, each measurement point is compared with each reference point of the pre-stored pattern, thereby calculating the geometric characteristics of the projection surface. If the objects 400, illustrated in FIG. 4, form a complex pattern, each shaded portion illustrated in FIG. 18 corresponds to one pixel. In this case, each shaded portion may be determined as a measurement point. If the objects 600 illustrated in FIG. 6 form a complex pattern, each shaded portion in FIG. 18 corresponds to four pixels that form each square. In this case, a corner of each shaded portion may be determined as a measurement point.

That is, the correction module 170 may compare a relative distance and direction between measurement points with those between reference points, thereby predicting the geometric form of the projection surface. In addition to the methods described above, various known technologies for modelling geometric characteristics of a projection surface can be applied to embodiments of the present invention.

The correction module 170 may determine a degree of color and geometric correction of an image frame to be projected, based on the result of calculating the characteristics of the projection surface and may provide the determined degree of correction to the image processing module 130. Accordingly, the image processing module 130 may correct the image frame by reflecting the color and geometric characteristics of the projection surface and provide a corrected image frame.

Although not described in the above description, when an image frame is projected by the projection module 140, it may be distorted due to unique characteristics of the projection module 140. In addition, when the photographing module 150 photographs the image frame projected onto the projection surface, the photographed image frame, i.e., a photographed image frame, may be distorted compared with the projected image frame due to unique characteristics of the photographing module 150. Such distortion characteristics of the projection module 140 and the photographing module 150 may be reflected when the correction module 170 performs a correction operation. These distortion characteristics may be calculated in advance, for example, when the image correction apparatus 100 is produced.

Figure 19:
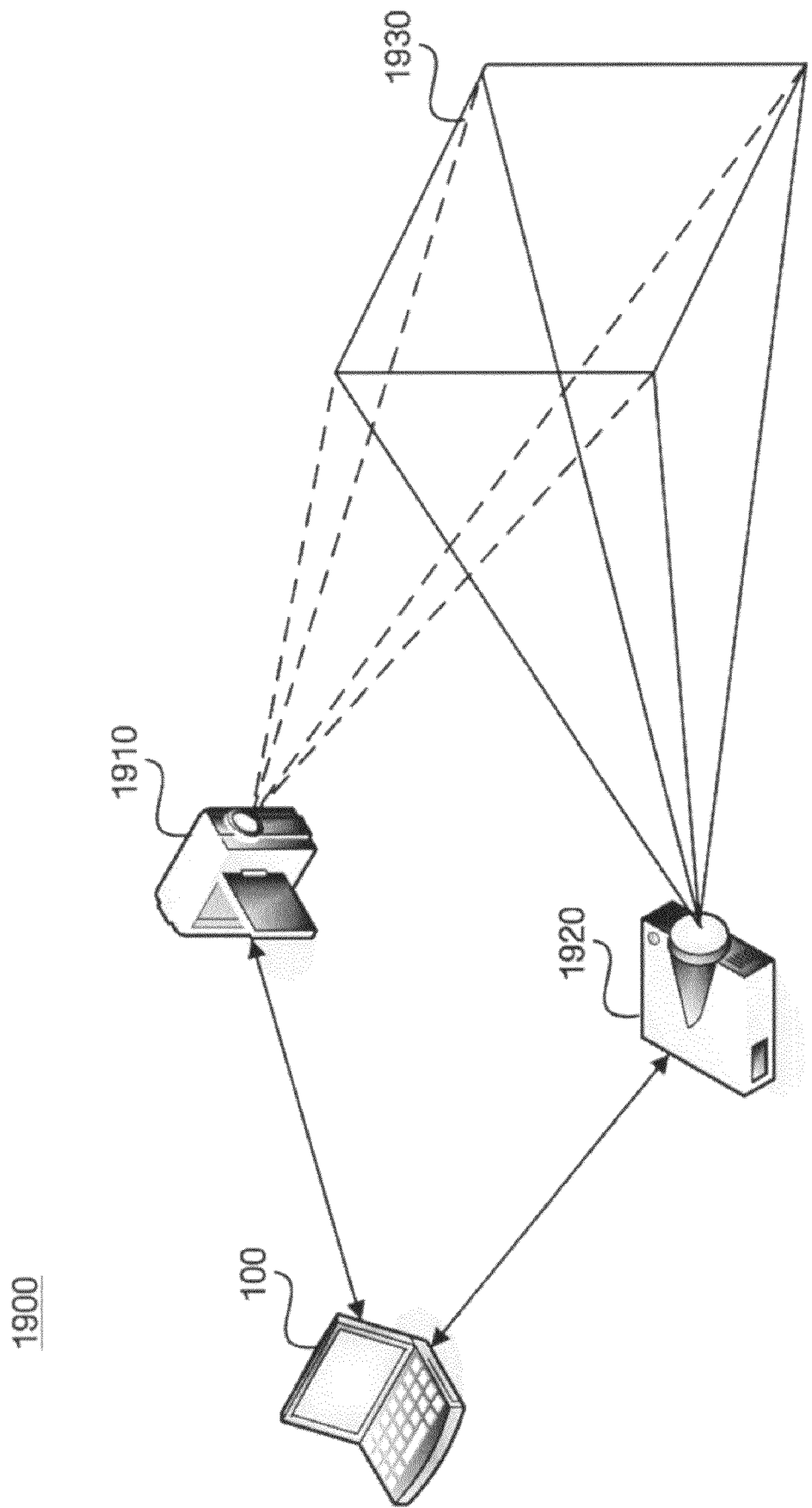
FIG. 19 illustrates an image correction system, according to an embodiment of the present invention.

The image correction apparatus 100 described above may include both the projection module 140 and the photographing module 150. However, embodiments of the present invention are not limited thereto. For example, the image correction apparatus 100 may include a projector interface (not shown), which connects the image correction apparatus 100 to a projector (not shown), instead of the projection module 140 and a camera interface (not shown), which connects the image correction apparatus 100 to a camera (not shown) photographing a projected image frame, instead of the photographing module 150. In this case, the image correction apparatus 100, a camera 1910, and a projector 1920 may be a single system 1900 for correcting an image frame projected onto a projection surface 1930 as illustrated in FIG. 19.

The operation of the image correction apparatus 100 described above will now be described.

Figure 20:
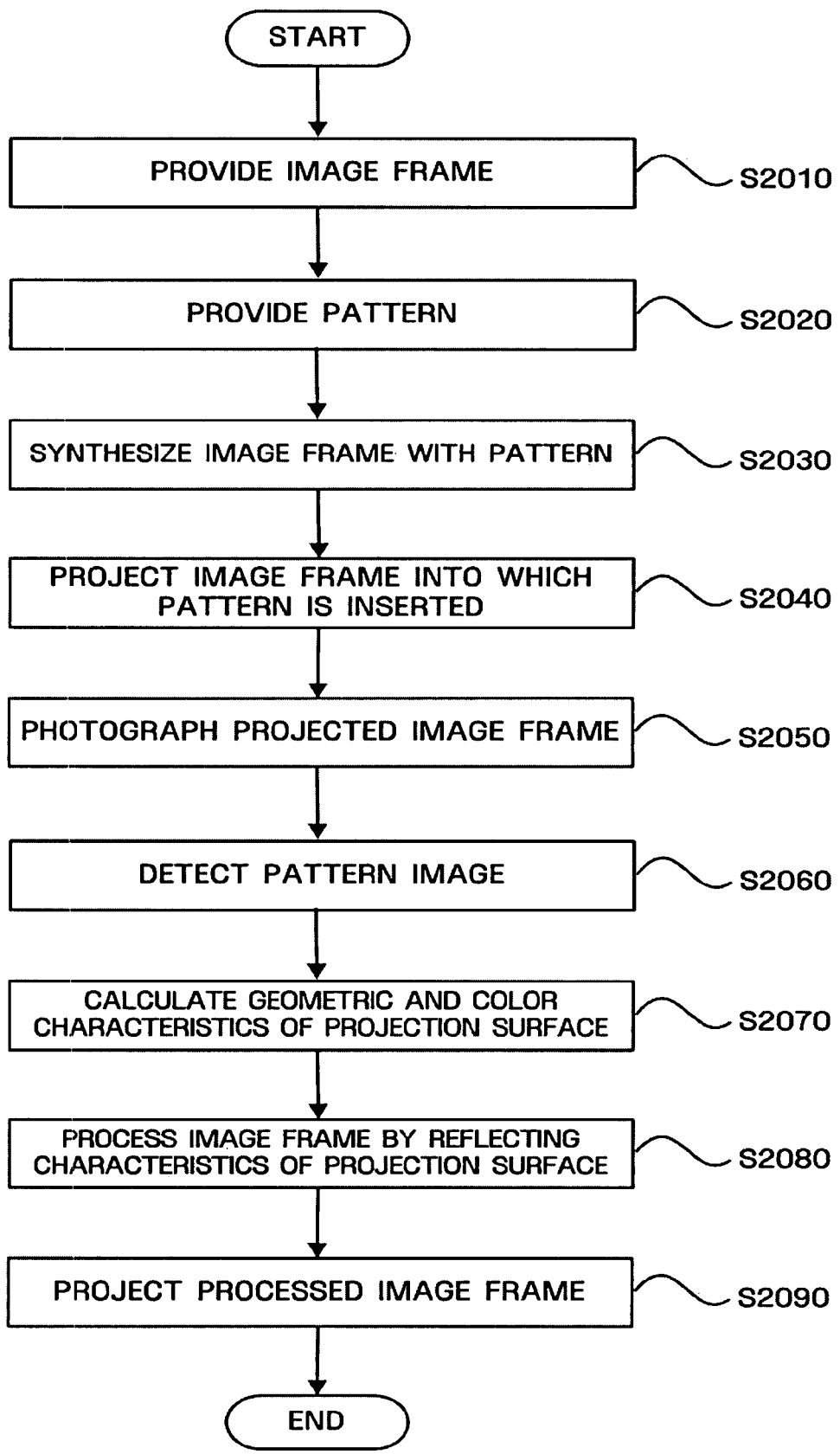
FIG. 20 is a flowchart illustrating an image correction method, according to an embodiment of the present invention.

FIG. 20 is a flowchart illustrating an image correction method according to an embodiment of the present invention.

Referring to FIG. 20, the image provision module 110 may sequentially provide image frames that are to be projected in operation S2010. When the image provision module 110 provides the image frames, the pattern provision module 120 may provide patterns that are to be added to the image frames in operation S2020. As described above, the pattern provision module 120 may also provide reference and offset patterns in an alternating fashion.

Next, the image processing module 130 may synthesize the image frames with the patterns, respectively in operation S2030. A method of synthesizing an image frame with a pattern includes the temporal encoding method and the spatial encoding method as described above, although any of the coding methods can be used.

The image processing module 130 alternately may generate an image frame into which a reference pattern is inserted and an image frame into which an offset pattern is inserted, and the image frames processed by the image processing module 130 may be sequentially projected by the projection module 140 onto a predetermined projection surface in operation S2040.

Here, the image frame synthesized with the reference pattern and the image frame synthesized with the offset pattern may be alternately projected as described above with reference to FIGS. 12 through 14. Although the image frames may be synthesized with the reference and offset patterns and projected accordingly, since the reference and offset patterns are offset by each other due to human visual characteristics, a user cannot recognize the reference and offset patterns superimposed on the image frame.

If the projection module 140 projects the image frames, the photographing module 150 may photograph the projected image frames in operation S2050. As described above, the photographing module 150 and the projection module 140 may be synchronized with each other. Therefore, the photographing module 150 may photograph every image frame projected by the projection module 140 and may provide a photographed image frame for each image frame. Since the photographing module 150 is not affected by the human visual characteristics, each photographed image frame may include the reference or offset pattern synthesized with an image frame in operation S2030.

The pattern detection module 160 may detect a pattern image using the photographed image frames provided by the photographing module 150 in operation S2060. In order to detect a pattern image, the pattern detection module 160 may subtract two consecutive photographed image frames from each other, for example. One of the two photographed image frames may be synthesized with the reference pattern, and the other one of the two photographed image frames may be synthesized with the offset pattern. Therefore, if the two consecutive photographed image frames are subtracted from each other, an original image frame is offset, and a difference value between the reference and offset patterns remains. The difference value is a pattern image.

If the pattern image is detected, the correction module 170 may calculate geometric and color characteristics of the projection surface using the detected pattern image in operation S2070. If the pattern image includes a region without color information, interpolation, which uses color information of a surrounding region, may be applied to the region. Accordingly, the color characteristics of the entire projection surface may be calculated.

The correction module 170 may provide to the image processing module 130 correction information required to correct an image frame based on the characteristics of the projection surface calculated in operation S2070. Accordingly, the image processing module 130 may process the image frame while reflecting the geometric and color characteristics of the projection surface in operation S2080. For example, the image processing module 130 may apply a reversed function of a modeling function for the characteristics of the projection surface, which can be obtained in operation S2070, to an image frame that is to be newly projected, for example.

Accordingly, the projection module 140 may project the image frame processed by the image processing module 130 to reflect the characteristics of the projection surface (operation S2090).

Each component of the image correction apparatus 100 described above may be implemented as a 'module.' The term 'module', as used herein, may mean, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

In addition to this discussion, one or more embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including magnetic storage media (e.g., ROM, floppy disks, hard disks, etc.), optical recording media (e.g., CD-ROMs, or DVDs), and storage/transmission media such as carrier waves, as well as through the Internet, for example. Here, the medium may further be a signal, such as a resultant signal or bitstream, according to one or more embodiments of the present invention. The media may also be a distributed network, so that the computer readable code is stored/transferred and executed in a distributed fashion. Still further, as only an example, the processing element may include a processor or a computer processor, and processing elements may be distributed and/or included in a single device.

In one or more of the above embodiments, both the geometric and color characteristics of a projection surface are taken into consideration. However, in another embodiment of the present invention, the image correction apparatus 100 may correct an image frame by considering any one of the geometric and color characteristics of the projection surface.

In the one or more embodiments above, the temporal encoding method and the spatial encoding method have been described as separate methods. However, the temporal and spatial encoding methods may be integrated into a single coding method, which should also be considered within the scope of embodiments of the present invention.

As described above, a method, medium and apparatus for correcting a projected image can correct the distortion of a projected image frame, which is caused by characteristics of a projection surface, without a user's knowledge.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An image correction method comprising:
providing a plurality of temporally consecutive image frames comprising odd image frames and even image frames;
alternately inserting a reference pattern and an offset pattern into the consecutive image frames and either inserting the reference pattern into the even image frames when the offset pattern is inserted into the odd image frames or inserting the offset pattern into the even image frames when the reference pattern is inserted into the odd image frames, wherein the reference pattern comprises color information of a first color space and the offset pattern comprises color information of a second color space, the first and second color spaces being different color spaces;
detecting a pattern image based on the consecutive image frames into which the reference pattern and the offset pattern have been alternately inserted; and
correcting a projected image frame based on the detecting.

2. The method of claim 1, wherein the providing of the reference and offset patterns comprises providing a plurality of reference patterns having different color information, and a plurality of offset patterns respectively corresponding to the reference patterns.

3. The method of claim 1, wherein the providing of the reference and offset patterns comprises providing a reference pattern including a plurality of color information and an offset pattern corresponding to the reference pattern.

4. The method of claim 1, wherein providing of the reference and offset patterns comprises providing one or more reference patterns having a predetermined geometric structure and an offset pattern corresponding to the reference patterns.

5. The method of claim 1, wherein the reference pattern comprises color information regarding a reference color that is to be added to pixels located at a predetermined position, and the offset pattern comprises color information which offsets the reference color from pixels located at the same position as the reference pattern.

6. The method of claim 5, wherein the color information of the reference pattern and the color information of the offset pattern are in a complementary color relationship.

7. The method of claim 5, wherein the color information of the reference pattern and the color information of the offset pattern have contrary information regarding an increase or decrease of the reference color.

8. The method of claim 1, further comprising photographing a first image frame into which the reference pattern is inserted and a second image frame into which the offset pattern is inserted among image frames projected onto a projection surface.

9. The method of claim 1, wherein the detecting the pattern image comprises subtracting a first photographed image frame obtained after a first image frame, into which the reference pattern is inserted, is photographed, from a second photographed image frame obtained after a second image frame, into which the offset pattern is inserted, is photographed, and acquiring the pattern image.

10. The method of claim 1, wherein the correcting the image frames comprises performing at least one of geometric correction and color correction on the projected image frame.

11. The method of claim 1, wherein the correcting the projected image frame comprises:
calculating characteristics of a projection surface using the detected pattern image; and
correcting the projected image frame by reflecting the calculated characteristics of the projection surface.

12. The method of claim 11, wherein the calculated characteristics of the projection surface comprise at least one of geometric and color characteristics.

13. The method of claim 1, wherein the detecting comprises detecting a pattern image based on photographing information of consecutive image frames into which a reference pattern and an offset pattern corresponding to the reference pattern are alternately inserted, and which are projected onto a projection surface accordingly.

14. An image correction apparatus comprising:
an image provision module to provide a plurality of temporally consecutive image frames comprising odd image frames and even image frames;
a pattern provision module alternately inserting a reference pattern and an offset pattern into the consecutive image frames and either inserting the reference pattern into the even image frames when the offset pattern is inserted into the odd image frames or inserting the offset pattern into the even image frames when the reference pattern is inserted into the odd image frames, wherein the reference pattern comprises color information of a first color space and the offset pattern comprises color information of a second color space, the first and second color spaces being different color spaces;
a pattern detection module to detect a pattern image based on the consecutive image frames into which the reference pattern and the offset pattern have been alternately inserted; and
an image processing module to correct a projected image frame based on the detected pattern image.

15. The apparatus of claim 14, further comprising a projection module to project the projected image frames.

16. The apparatus of claim 14, wherein the pattern provision module provides a plurality of reference patterns having different color information and a plurality of offset patterns respectively corresponding to the reference patterns.

17. The apparatus of claim 14, wherein the pattern provision module provides a reference pattern including a plurality of color information and an offset pattern corresponding to the reference pattern.

18. The apparatus of claim 14, wherein the pattern provision module provides one or more reference patterns having a predetermined geometric structure and an offset pattern corresponding to the reference patterns.

19. The apparatus of claim 14, wherein the reference pattern comprises color information regarding a reference color that is to be added to pixels located at a predetermined position, and the offset pattern comprises color information which offsets the reference color from pixels located at the same position as the reference pattern.

20. The apparatus of claim 19, wherein the color information of the reference pattern and the color information of the offset pattern are in a complementary color relationship.

21. The apparatus of claim 19, wherein the color information of the reference pattern and the color information of the offset pattern have contrary information regarding an increase or decrease of the reference color.

22. The apparatus of claim 14, further comprising a photographing module to photograph a first image frame into which the reference pattern is inserted, and a second image frame into which the offset pattern is inserted among image frames projected onto a projection surface.

23. The apparatus of claim 14, wherein the pattern detection module subtracts a first photographed image frame obtained after a first image frame, into which the reference pattern is inserted, is photographed, from a second photographed image frame obtained after a second image frame, into which the offset pattern is inserted, is photographed, and acquires the pattern image.

24. The apparatus of claim 14, wherein the image processing module performs at least one of geometric correction and color correction on the projected image frame.

25. The apparatus of claim 14, further comprising a correction module to calculate characteristics of a projection surface using the detected pattern image, and to correct the projected image frame by reflecting the calculated characteristics of the projection surface.

26. The apparatus of claim 25, wherein the calculated characteristics of the projection surface comprise at least one of geometric and color characteristics.

27. The apparatus of claim 24, wherein the pattern detection module detects a pattern image based on photographing information of consecutive image frames into which a reference pattern and an offset pattern corresponding to the reference pattern are alternately inserted and which are projected onto a projection surface accordingly.

28. A projected image correction method, comprising:
providing a plurality of temporally consecutive image frames including a first image frame and a second image frame;
inserting a reference pattern into the first image frame; and
inserting an offset pattern into the second image frame, wherein the reference pattern comprises color information of a first color space and the offset pattern comprises color information of a second color space, the first and second color spaces being different color spaces; and
correcting a projected image comprising the plurality of temporally consecutive image frames using the inserted reference pattern and the inserted offset pattern.

29. The method of claim 28, further comprising photographing the first image frame and the second image frame among image frames projected onto a projection surface.

30. The method of claim 29, further comprising detecting a pattern image based on the photographing.

31. The method of claim 29, further comprising correcting the projected image frames using at least one of geometric correction and color correction on the projected image frames.

32. The method of claim 31, wherein the correcting the projected image frames comprises:
    calculating characteristics of the projection surface using a detected pattern image; and
    correcting the projected image frames by reflecting the calculated characteristics of the projection surface.

33. At least one non-transitory medium comprising computer readable code to control at least one processing element to implement the method of claim 28.

34. The apparatus of claim 14, wherein the plurality of temporally consecutive image frames are each substantially different from each other thereby comprising a moving video image.

35. The apparatus of claim 14, wherein the plurality of temporally consecutive image frames are each identical thereby comprising a still image.

* * * * *